United States Patent
Kawamura et al.

(10) Patent No.: US 7,328,373 B2
(45) Date of Patent: Feb. 5, 2008

(54) DATA PROCESSING SYSTEM

(75) Inventors: Shunji Kawamura, Kawasaki (JP);
Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/545,990

(22) Filed: Oct. 10, 2006

(65) Prior Publication Data

US 2007/0033437 A1   Feb. 8, 2007

Related U.S. Application Data

(63) Continuation of application No. 10/808,946, filed on Mar. 24, 2004, now abandoned.

(30) Foreign Application Priority Data

Jan. 30, 2004   (JP) ............................. 2004-023090

(51) Int. Cl.
*G06F 11/00* (2006.01)
(52) U.S. Cl. ........................... 714/20; 714/15; 707/202
(58) Field of Classification Search ...................... None
See application file for complete search history.

(56) References Cited

U.S. PATENT DOCUMENTS

| | | | |
|---|---|---|---|
| 4,244,019 A | | 1/1981 | Anderson et al. |
| 4,894,828 A | | 1/1990 | Novy et al. |
| 4,959,768 A | | 9/1990 | Gerhart |
| 5,146,561 A | * | 9/1992 | Carey et al. ................. 709/200 |
| 5,155,845 A | | 10/1992 | Beal et al. |
| 5,170,480 A | | 12/1992 | Mohan et al. |
| 5,307,481 A | | 4/1994 | Shimazaki et al. |
| 5,379,418 A | | 1/1995 | Shimazaki et al. |
| 5,412,801 A | * | 5/1995 | de Remer et al. ............ 714/20 |
| 5,459,857 A | | 10/1995 | Ludlam et al. |

(Continued)

FOREIGN PATENT DOCUMENTS

| | | |
|---|---|---|
| JP | 62-274448 | 11/1987 |
| JP | 10-133926 | 5/1988 |
| JP | 02-037418 | 2/1990 |
| JP | 07-191811 | 7/1995 |

OTHER PUBLICATIONS

Lyon "Tandem's Remote Data Facility," Proc. IEEE Spring CompCon Conf, pp. 562-567 (1990).

(Continued)

*Primary Examiner*—Gabriel Chu
(74) *Attorney, Agent, or Firm*—Townsend and Townsend and Crew LLP

(57) ABSTRACT

In a data processing system Saving a primary site and a secondary site, storage systems are connected to each other via a communication line, data update history is recorded in a storage device as a journal in the primary site, and the journal is transferred to the secondary site via the communication line. During such transfer, loads will not concentrate to a specific volume, by switching the volume that stores the journal in the primary site, while, by switching the transfer-destination volume of the journal in the secondary site.

With such arrangement, in a data processing system, it is possible to ensure data consistency in a plurality of sites and prevent the system throughput capacity from being deteriorated without applying loads to a host and a network, and without causing load concentration on a specific storage device that is caused as a result of data update or recovery operations.

39 Claims, 15 Drawing Sheets

U.S. PATENT DOCUMENTS

| | | | |
|---|---|---|---|
| 5,544,347 A | 8/1996 | Yanai et al. | |
| 5,555,371 A | 9/1996 | Duyanovich et al. | |
| 5,627,961 A | 5/1997 | Sharman | |
| 5,682,513 A | 10/1997 | Candelaria et al. | |
| 5,720,029 A | 2/1998 | Kern et al. | |
| 5,734,818 A | 3/1998 | Kern et al. | |
| 5,742,792 A | 4/1998 | Yanai et al. | |
| 5,799,323 A | 8/1998 | Mosher et al. | |
| 5,835,953 A | 11/1998 | Ohran | |
| 5,870,537 A | 2/1999 | Kern et al. | |
| 5,901,327 A | 5/1999 | Yuval | |
| 5,933,653 A | 8/1999 | Yuval | |
| 5,974,563 A | 10/1999 | Beeler | |
| 5,995,980 A | 11/1999 | Olson et al. | |
| 6,044,444 A | 3/2000 | Yuval | |
| 6,052,696 A * | 4/2000 | Euler et al. | 707/202 |
| 6,052,758 A | 4/2000 | Crockett et al. | |
| 6,055,604 A * | 4/2000 | Voigt et al. | 711/117 |
| 6,092,066 A | 7/2000 | Yuval | |
| 6,101,497 A | 8/2000 | Yuval | |
| 6,148,383 A | 11/2000 | Micka et al. | |
| 6,157,991 A | 12/2000 | Arnon | |
| 6,173,377 B1 | 1/2001 | Yanai et al. | |
| 6,178,427 B1 | 1/2001 | Parker | |
| 6,182,121 B1 * | 1/2001 | Wlaschin | 709/215 |
| 6,209,002 B1 | 3/2001 | Gagne et al. | |
| 6,282,610 B1 | 8/2001 | Bergsten | |
| 6,298,345 B1 * | 10/2001 | Armstrong et al. | 707/8 |
| 6,308,283 B1 | 10/2001 | Gal.ipeau et al. | |
| 6,324,654 B1 | 11/2001 | Wahl et al. | |
| 6,360,306 B1 | 3/2002 | Bergsten | |
| 6,363,462 B1 | 3/2002 | Bergsten | |
| 6,393,538 B2 | 5/2002 | Murayama | |
| 6,397,307 B2 | 5/2002 | Ohran | |
| 6,408,370 B2 | 6/2002 | Yamamoto et al. | |
| 6,442,706 B1 | 8/2002 | Wahl et al. | |
| 6,446,176 B1 | 9/2002 | West et al. | |
| 6,460,055 B1 | 10/2002 | Midgley et al. | |
| 6,463,501 B1 | 10/2002 | Kern et al. | |
| 6,467,034 B1 | 10/2002 | Yanaka | |
| 6,477,627 B1 | 11/2002 | Yuval | |
| 6,487,645 B1 | 11/2002 | Clark et al. | |
| 6,496,908 B1 | 12/2002 | Kamvysselis et al. | |
| 6,526,487 B2 | 2/2003 | Ohran et al. | |
| 6,560,617 B1 | 5/2003 | Winger et al. | |
| 6,598,134 B2 | 7/2003 | Ofek et al. | |
| 6,618,818 B1 | 9/2003 | Wahl et al. | |
| 6,622,152 B1 | 9/2003 | Sinn et al. | |
| 6,625,623 B1 | 9/2003 | Midgley et al. | |
| 6,662,197 B1 | 12/2003 | LeCrone et al. | |
| 6,732,124 B1 | 5/2004 | Koseki et al. | |
| 6,804,676 B1 | 10/2004 | Bains | |
| 6,823,336 B1 | 11/2004 | Srinivasan et al. | |
| 6,883,122 B2 | 4/2005 | Maple et al. | |
| 6,898,685 B2 | 5/2005 | Meiri et al. | |
| 6,941,322 B2 | 9/2005 | Bills et al. | |
| 6,959,369 B1 | 10/2005 | Ashton et al. | |
| 6,968,349 B2 | 11/2005 | Owen et al. | |
| 7,051,176 B2 | 5/2006 | Meiri et al. | |
| 2002/0133511 A1 | 9/2002 | Hostetter et al. | |
| 2002/0143888 A1 | 10/2002 | Lisiecki et al. | |
| 2002/0194442 A1 | 12/2002 | Yanai et al. | |
| 2003/0014432 A1 | 1/2003 | Teloh et al. | |
| 2003/0014433 A1 | 1/2003 | Teloh et al. | |
| 2003/0051111 A1 | 3/2003 | Nakano et al. | |
| 2003/0074378 A1 | 4/2003 | Midgley et al. | |
| 2003/0074600 A1 | 4/2003 | Tamatsu et al. | |
| 2003/0084075 A1 | 5/2003 | Bal.ogh et al. | |
| 2003/0088733 A1 | 5/2003 | Obara et al. | |
| 2003/0172093 A1 | 9/2003 | Nagoya | |
| 2003/0204479 A1 | 10/2003 | Bills et al. | |
| 2003/0217031 A1 | 11/2003 | Owen et al. | |
| 2003/0220935 A1 | 11/2003 | Vivian et al. | |
| 2003/0225760 A1 | 12/2003 | Ruuth et al. | |
| 2003/0229764 A1 | 12/2003 | Ohno et al. | |
| 2004/0030696 A1 | 2/2004 | Lechner | |
| 2004/0030703 A1 | 2/2004 | Bourbonnais et al. | |
| 2004/0059738 A1 | 3/2004 | Tarbell | |
| 2004/0117344 A1 | 6/2004 | Yang | |
| 2004/0122796 A1 * | 6/2004 | Akiyama et al. | 707/1 |
| 2004/0172509 A1 | 9/2004 | Takeda et al. | |
| 2004/0193802 A1 | 9/2004 | Meiri et al. | |
| 2004/0267829 A1 * | 12/2004 | Hirakawa et al. | 707/200 |
| 2005/0033828 A1 | 2/2005 | Watanabe | |
| 2005/0038968 A1 | 2/2005 | Iwamura et al. | |
| 2005/0050115 A1 | 3/2005 | Kekre | |
| 2005/0055523 A1 | 3/2005 | Suishu et al. | |
| 2005/0060346 A1 * | 3/2005 | Schmid | 707/104.1 |
| 2005/0114467 A1 | 5/2005 | Ikegaya et al. | |
| 2005/0125465 A1 | 6/2005 | Arakawa et al. | |
| 2005/0125617 A1 | 6/2005 | Ninose et al. | |
| 2005/0132155 A1 | 6/2005 | Kasako | |
| 2005/0144380 A1 | 6/2005 | Suzuki et al. | |
| 2005/0149666 A1 | 7/2005 | Meiri et al. | |
| 2005/0172166 A1 | 8/2005 | Eguchi et al. | |
| 2005/0198454 A1 | 9/2005 | Yoder et al. | |

OTHER PUBLICATIONS

"IBM DB2 Replication Guide and Reference, version 7," IBM Corporation Armonk, NY (2000).
"IBM DB2 Replication Guide and Reference, version 8," IBM Corporation Armonk, NY (2003).
"IBM DB2 RepliData for z/OS, version 3.1" IBM Corporation Armonk, NY (Mar. 2003).
"IBM DB2 DataPropagator for z/OS, version 8.1" IBM Corporation Armonk, NY (2002).
State Intellectual Property Rights Office of China (SIPO) office action dated Dec. 10, 2006 for SIPO application CN2004-100500348.

* cited by examiner

FIG. 3

| 410 | JOURNAL GROUP ID | | |
|---|---|---|---|
| 420 | LATEST JOURNAL SEQUENCE NO. | | |
| 430 | DATA VOLUME INFORMATION | DATA VOLUME 1 | DATA VOLUME MANAGEMENT INFORMATION — 431 |
| | | DATA VOLUME 2 | ... |
| | | ... | |
| 440 | JOURNAL VOLUME INFORMATION | JOURNAL VOLUME 1 | VOLUME ID — 441 |
| | | | FIRST JOURNAL SEQUENCE NO. — 442 |
| | | | LAST JOURNAL SEQUENCE NO. — 443 |
| | | JOURNAL VOLUME 2 | ... |
| | | ... | |
| | | JOURNAL VOLUME ID FOR STORAGE | — 444 |
| 450 | TRANSFER GROUP INFORMATION | JOURNAL GROUP ID | — 451 |
| | | TRANSFER-COMPLETED JOURNAL SEQUENCE NO. | — 452 |
| | | REFLECTION-COMPLETED JOURNAL SEQUENCE NO. | — 453 |
| | | PAIR STATUS | — 454 |

DATA PROCESSING SYSTEM

BACKGROUND OF THE INVENTION

The present invention refers to data processing systems, and more particularly to a data processing system that is suitable for use with a technology to distribute and store journals in a plurality of sites.

The data processing system is demanded to prevent data loss in a storage system during disaster or the like. To this end, a technology to duplicate data in a storage system located in a remote place has a significant meaning. Note that the storage system referred to herein includes storage devices such as a storage controller and a disk drive.

A technology to duplicate data stored in a storage system to another storage system is disclosed in U.S. Pat. No. 6,324,654. This patent further discloses a technology wherein, upon receipt of a write system call, a device driver of the OS of a computer (hereinafter referred to as a "primary host") incorporated in a first system writes data to a local data device and stores update log in a write log device, a program of the primary host transfers updated log to a program of a computer (hereinafter referred to as a "secondary host") incorporated in a second system, and data of a data device of the second system is updated based on the update log information received by the program of the secondary host.

In the above-stated prior art, data stored in respective storage systems of the primary host and the secondary host is transferred between the two hosts. At this time, the hosts are used as transport paths of the data. Since the data stored in the storage systems are transferred via a communication link between the hosts, the prior art had problems that the CPU loads of the respective hosts, channel loads, and traffics in a line connecting the hosts are increased. Further, the prior art had another problem that, since no considerations are given on load balancing of the devices that occurs due to log sampling, log writing processes and log reading processes concentrate on the write log device.

The present invention has been made to solve above-stated problems of the prior art, and an object of the present invention is to provide a data processing system capable of recovering data by sampling data update logs, which is able to assure data consistency in a plurality of sites without deteriorating its processing capability by giving no load on hosts and a network, and avoiding centralized loads on a specific storage device due to data update or recovery.

SUMMARY OF THE INVENTION

A data processing system according to the present invention includes a primary site and a secondary site, and each of such sites is provided with a host and a storage system.

Information on a data update stored in a storage system of the primary site (hereinafter referred to as a "primary storage system") is stored as a journal (update history). More specifically, the journal is a log of duplicated data copy and metadata that are used for an update.

The primary storage system transfers the journal to a storage system of the secondary site (hereinafter referred to as a "secondary storage system") via a communication line connected to the secondary storage system. The secondary storage system recovers data stored in the secondary storage system by using the journal received from the primary storage system (Recovering data by using a journal shall be referred to as the "journal reflection" hereunder).

In the present invention, since recovery is performed by transferring a journal, not mere data, to the secondary site, it is possible to quickly recover data at no particular point of time upon occurrence of a failure, thus ensuring to guarantee data consistency.

Further, in the present invention, the primary storage system incorporates a plurality of logical volumes that store journals, and concentration of logical volumes and accesses in the journal transfer source can be avoided by switching storage logical volumes used at this time for journal logs, thus ensuring adequate load balancing.

Likewise, in the secondary storage system, concentration of accesses can be avoided by switching a logical volume of the journal transfer target that is used for journal transfer to set a volume different from the logical volume, thus ensuring adequate load balancing.

It should be noted that the system may be configured such that the journal transfer can be realized by issuing a request for journal transfer to the primary storage system from the secondary storage system.

In addition, the system may also be configured such that the primary host and the secondary host are designed to monitor the status of storage system connected to each host based on a program that runs on each host, and the host in each site instructs data transfer between the storage systems to the storage system of the site concerned.

According to the present invention described above, there is provided a data processing system capable of recovering data by sampling data update logs. More specifically, the data processing system can assure data consistency on a plurality of sites, by giving no loads on the hosts and the network, and without causing deteriorated system processing capability, by avoiding centralized loads on a specific storage device to be caused as a result of data update or recovery.

BRIEF DESCRIPTION OF DRAWINGS

FIG. 3 is a diagram showing journal group management information;

DESCRIPTION OF THE PREFERRED EMBODIMENTS

Hereinafter, preferred embodiments according to the present invention will be described with reference to FIGS. 1 to 17.

First Embodiment

A first preferred embodiment according to the present invention will be described below with reference to FIGS. 1 to 13.

(I) Configuration of Data Processing System

First, a configuration of a data processing system according to the first embodiment of the present invention will be described with reference to FIG. 1.

Figure 1:
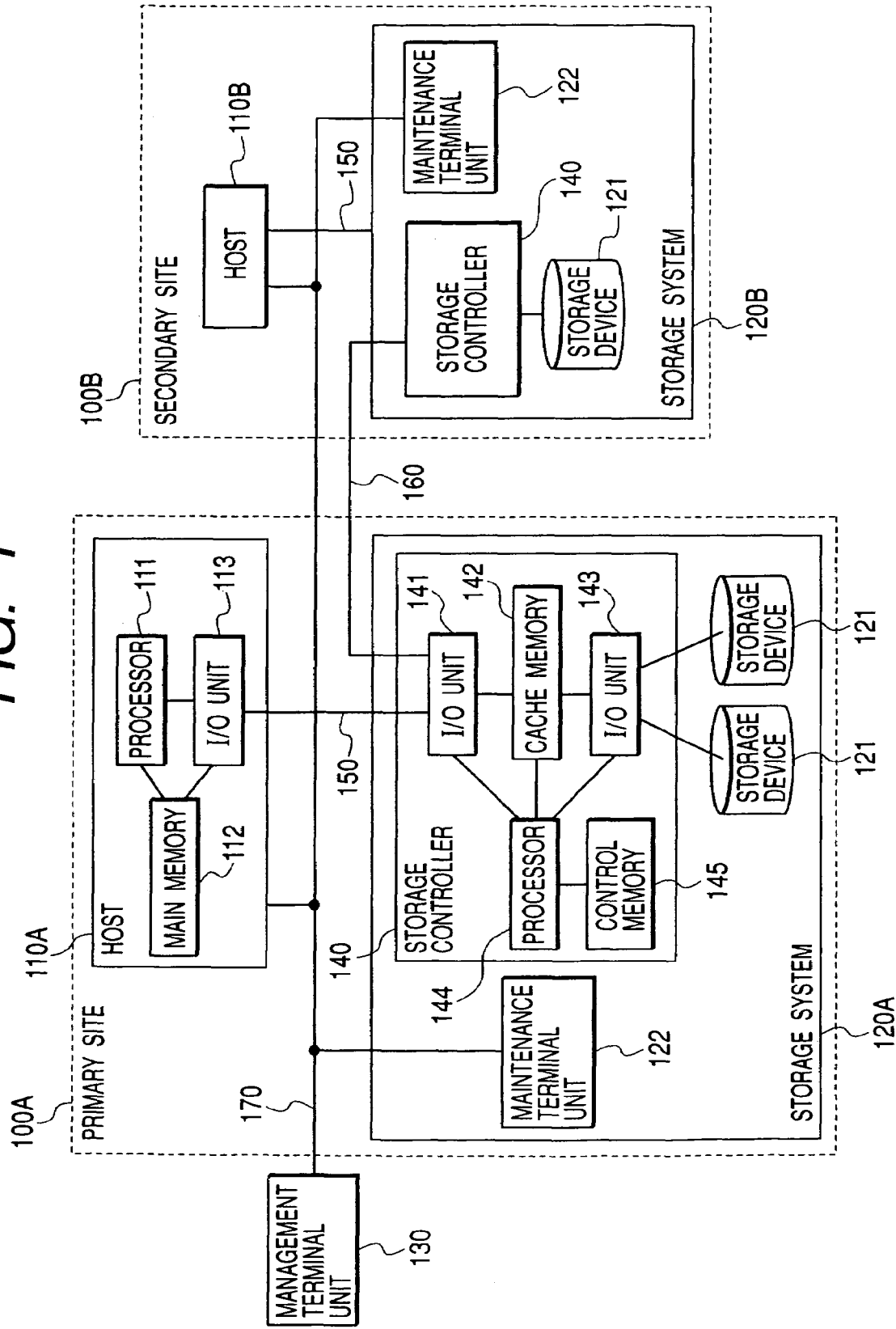
FIG. 1 is a diagram showing a hardware configuration of a data processing system according to a first preferred embodiment of the present invention.
Figure 2:
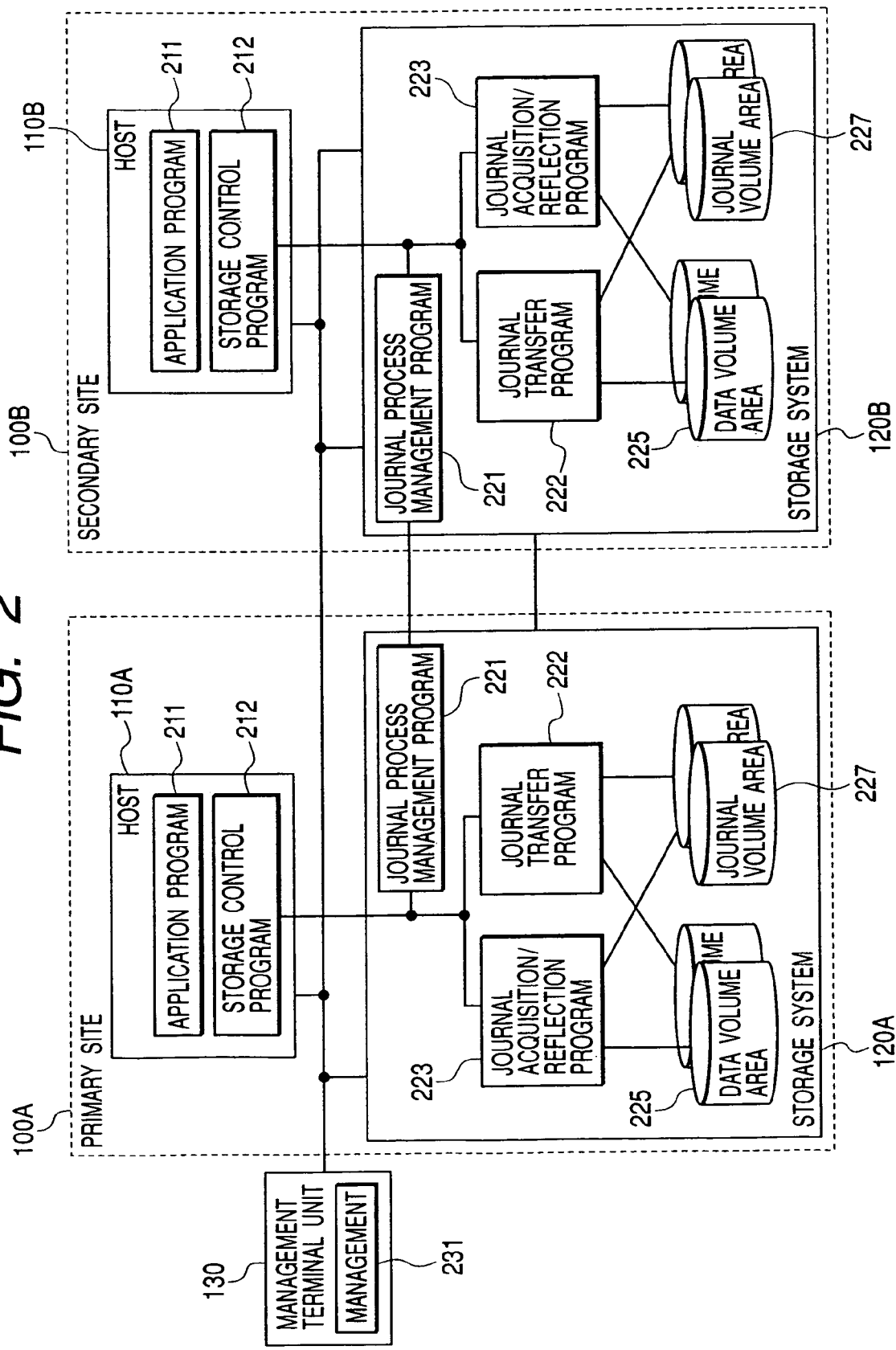
FIG. 2 is a diagram showing a functional configuration of a data processing system according to the first preferred embodiment of the present invention.

FIG. 1 is a diagram showing a hardware configuration of the data processing system according to the first embodiment of the present invention. FIG. 2 is a diagram showing a functional configuration of the data processing system according to the first embodiment of the present invention.

The data processing system of the embodiment allows sites to work together to process data. Each of the sites includes a host and a storage system.

Here, a first site is referred to as a "primary site" and a second site is referred to as a "secondary site". An example of transferring a journal from the primary site to the secondary site will be described below. Further, a host that belongs to the primary site shall be called a "primary host", a storage system that belongs to the primary site shall be called a "primary storage system", a journal to be stored in a storage device of the primary storage system shall be called a "primary journal", and a volume to be stored in the primary journal shall be called as a "primary journal volume". The same shall applies to the secondary site.

Now, as shown in FIG. 1, a primary site 100A includes a primary host 110A and a primary storage system 120A, while a secondary host 100B includes a secondary host 110B and a secondary storage system 120B, and a management terminal unit 130 is connected to the hosts and the systems.

The two hosts 110 (i.e., the primary host 110A and the secondary host 110B) are computers. Each of the computers includes a processor 111, a main memory 112 and an I/O unit 113. In addition, the computer is specifically a workstation, a personal computer, a mainframe, or the like.

Each of the storage systems 120 includes a storage controller 140, one or more storage devices 121 and a maintenance terminal unit 122. The storage device 121 is an auxiliary storage device such as a magnetic disk storage device or an optical disk storage device. However, the systems 120 may not be provided with the maintenance terminal unit 122.

The storage controller 140 includes a host I/O unit 141, a cache memory 142, a disk I/O unit 143, a processor 144 and a control memory 145.

The two hosts are respectively connected to the storage systems via a host-storage system network 150 such as a local area network (LAN) or a storage area network (SAN). The processor 111 and the main memory 112 of a host are connected to the host I/O processor 141 of the appropriate storage system 120 via the I/O unit 113 and the host-storage system network 150.

The two storage systems are connected to each other via an inter-storage system network 160. In general, global networks such as public telephone lines are frequently used for the inter-storage system network 160, and the networks are often rented on a charged base by communication service-providers. Such global networks are frequently used to maintain a certain distance for system safeties (to prevent both sites from simultaneous failures), but local networks may be used in a case the two storage systems are located in a room, a building or adjacent buildings, provided that, however, the present invention is not limited to such network types.

The management terminal unit 130 is also a computer that has a processor or a main storage device. The management terminal unit 130, the primary host 110A, the secondary host 110B, the primary storage system 120A and the secondary storage system 120B are connected to each other via a network 170 such as a LAN or a WAN.

FIG. 2 shows a functional configuration of such data processing system as stated above.

In each of the storage controller 140, a journal process management program 221, a journal transfer program 222 and a journal acquisition/reflection program 223, which are programs used for controlling data transfer between the storage systems 120, are executed on the processor 144. These programs are stored in the control memory 145.

The journal process management program 221 manages journal processing (journal acquisition, journal transfer and journal reflection) that is executed by each storage system. Such processing will be described in detail later. Further, during the journal-processing phase, communication is performed from time to time between the journal process management programs 221 of the respective storage controllers 140, thus exchanging management information required for the journal processing.

The journal acquisition/reflection program 223 is a program enabling the processor 144 to acquire and reflect journals, and the program 223 is composed of a journal acquisition program and a journal reflection program.

Further, the storage controller 140 also executes I/O processing to and from the storage device 121 based on instructions from hosts, in addition to processing associated with the journal process management program 221, the journal transfer program 222 and the journal acquisition/reflection program 223.

The storage device 121 has one or more logical storage areas (logical volumes) created therein. A logical volume is associated with a physical storage area owned by the storage device 121. These logical volumes are used as a data volume area 225 and a journal volume area 227 as designated by a user. It should be noted that, in each host 110, an application program 211 used by a user or a storage control program 212 which executes control of interface with the storage systems are also executed by the processors 111 owned by the hosts 110. In addition, the journal processing management program 221 and the storage control program 212 mutually exchange information.

It should also be noted that a data volume, owned by the primary storage system 120A, which should be the copy source for data duplication shall be referred to as the "PVOL", and a data volume, owned by the secondary storage system 120B, which should be the duplication target of data to be stored in the PVOL shall be referred to as the "SVOL."

A management program 231 that is executed on the management terminal unit 130 manages configuration elements of the data processing system according to the embodiment, or more specifically the program manages hosts 110 or storage systems 120. The management program 231 is stored in the main storage device of the management terminal unit 130.

It should be noted that programs described above are installed in a storage medium owned by each devices by using a mobile medium such as a compact disk or a magnet-optical disk, or via the network 170.

(II) Data Structure Used for the Data Processing System

Next, a data structure to be used for the data processing system according to the embodiment will be described with reference to FIGS. 3 to 9.

Figure 4:
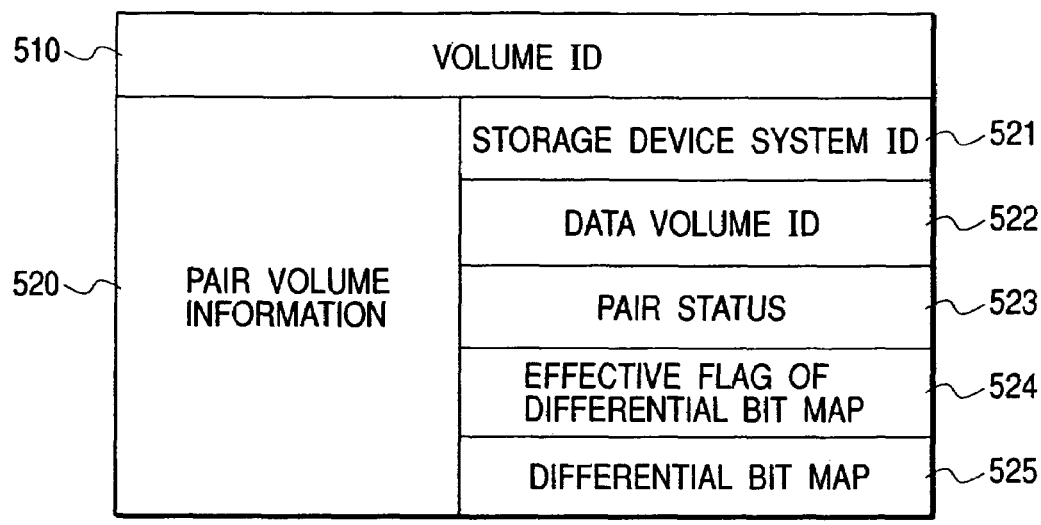
FIG. 4 is a diagram showing data volume management information.
Figure 5:
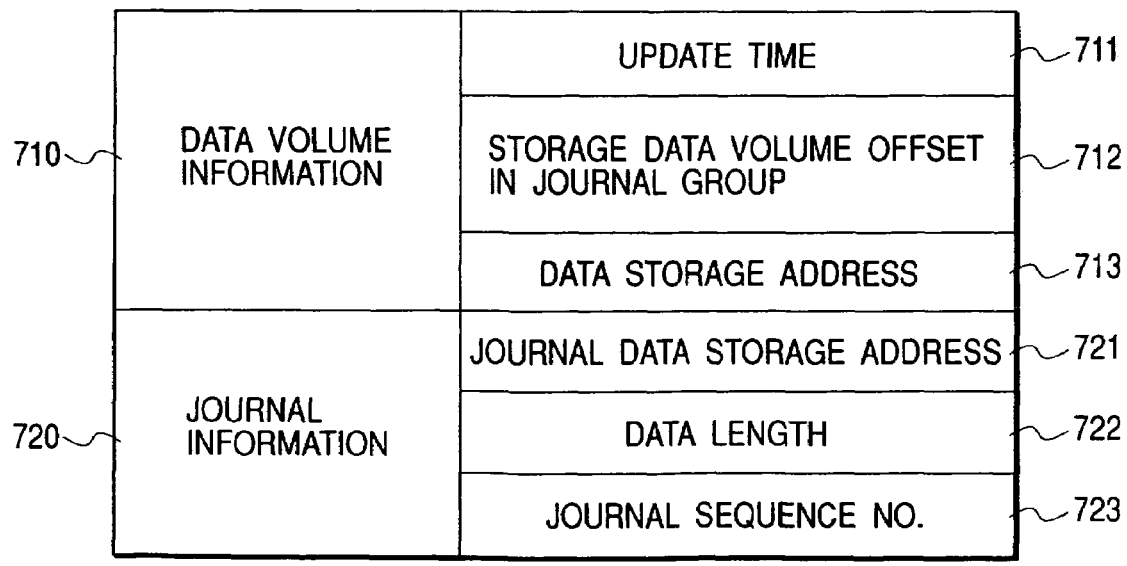
FIG. 5 is a diagram showing journal meta-information.
Figure 6:
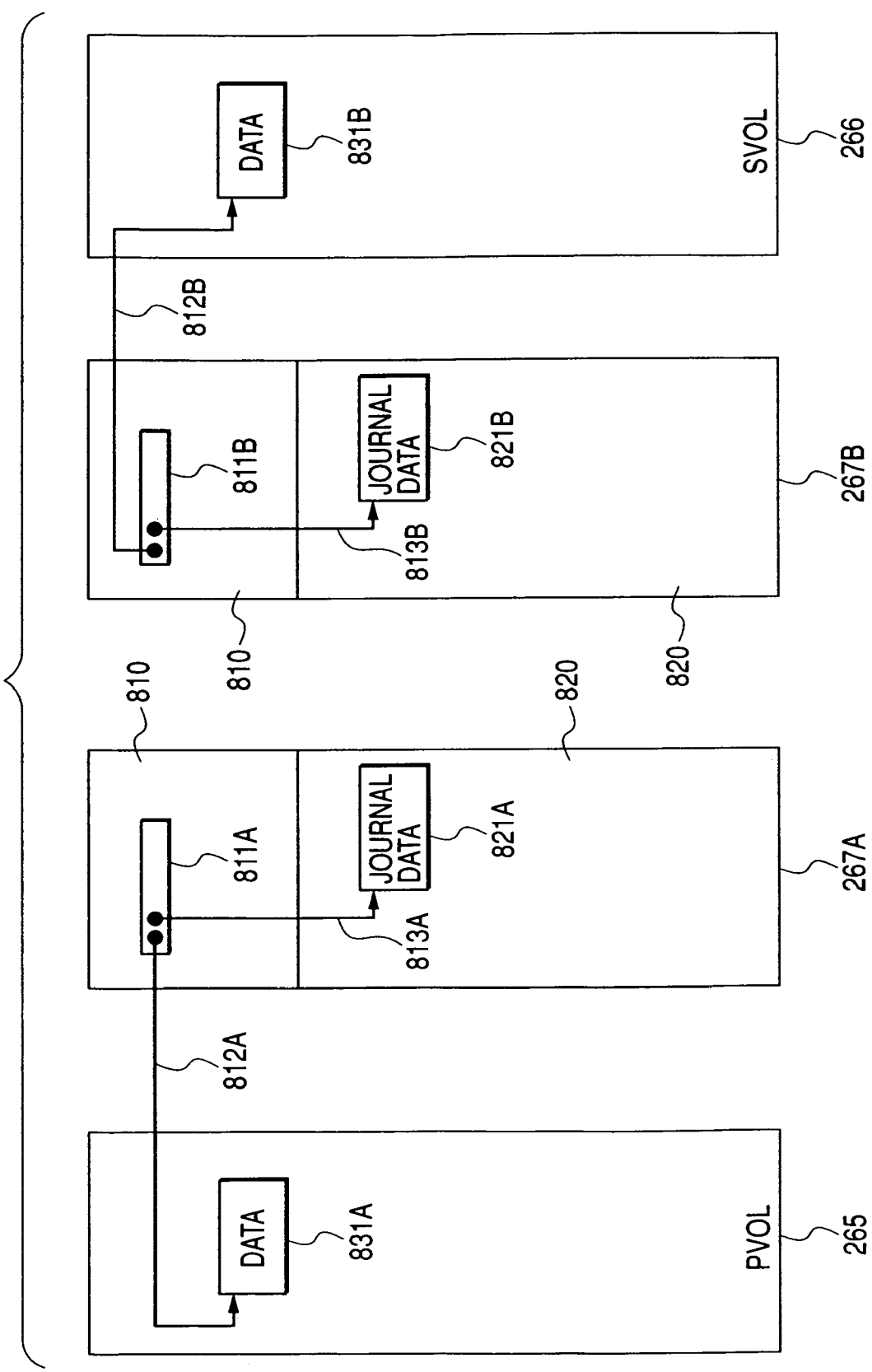
FIG. 6 is a diagram showing correlations between a data volume and a journal volume.
Figure 7:
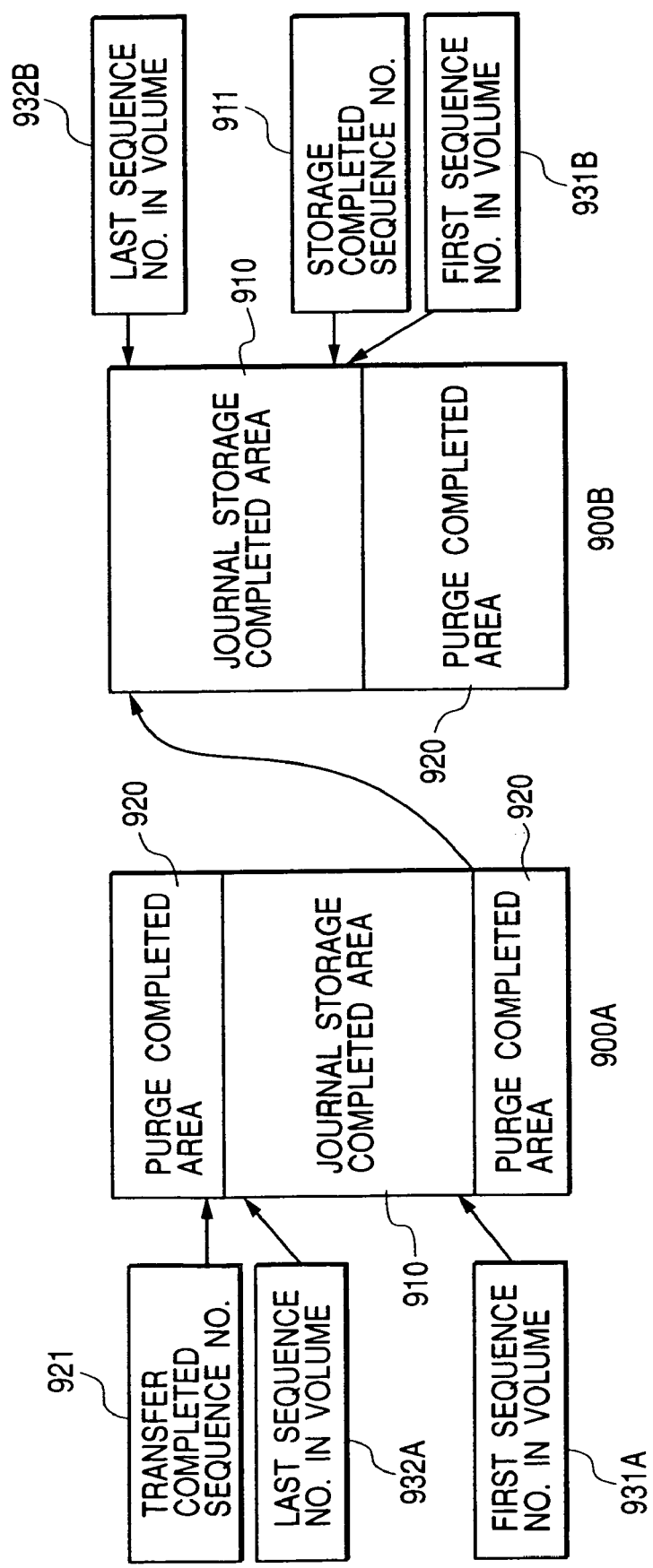
FIG. 7 is a diagram showing an internal structure of a journal data area 820 in a primary journal volume.
Figure 8:
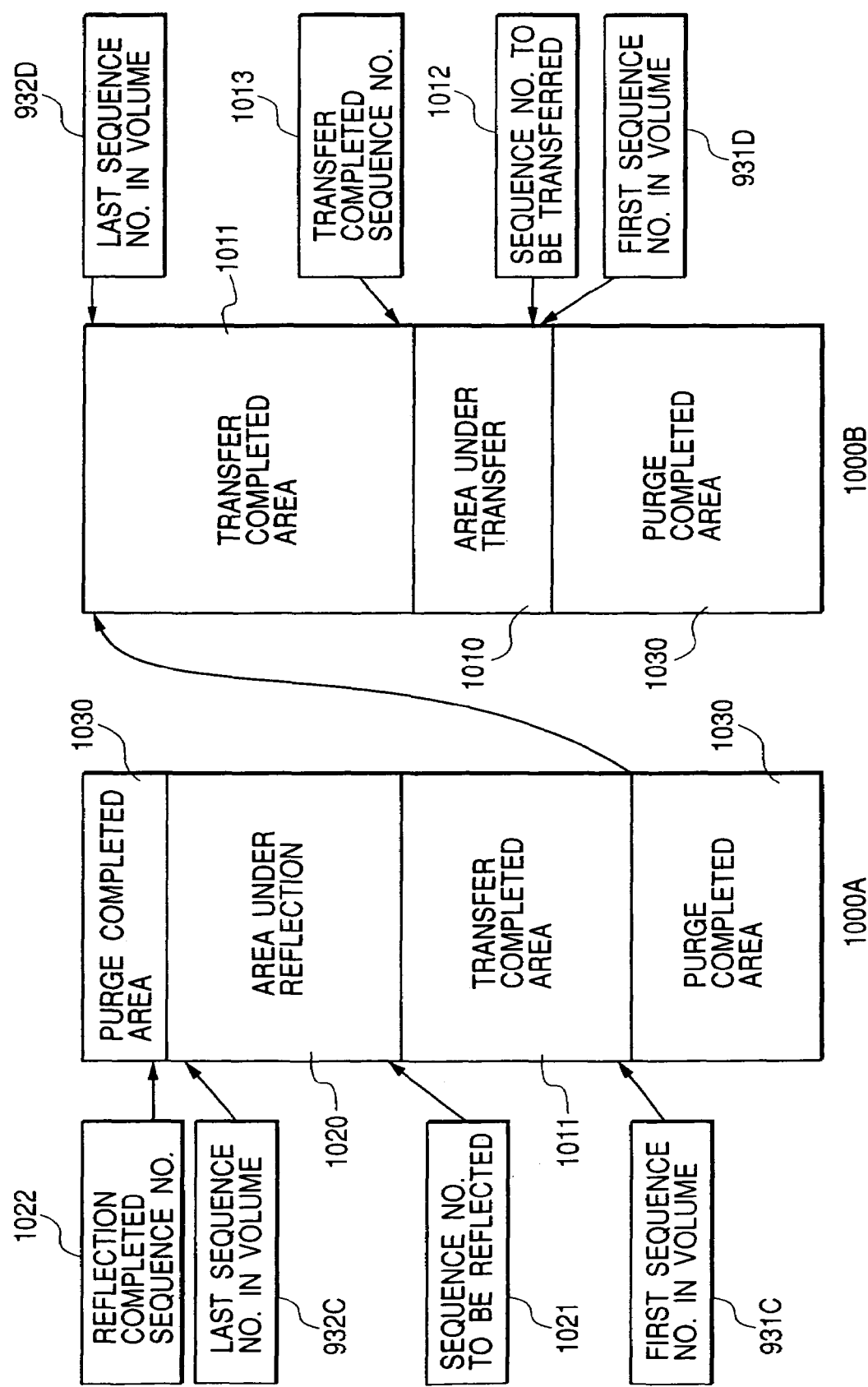
FIG. 8 is a diagram showing an internal structure of a journal data area 820 in a secondary journal volume.
Figure 9:
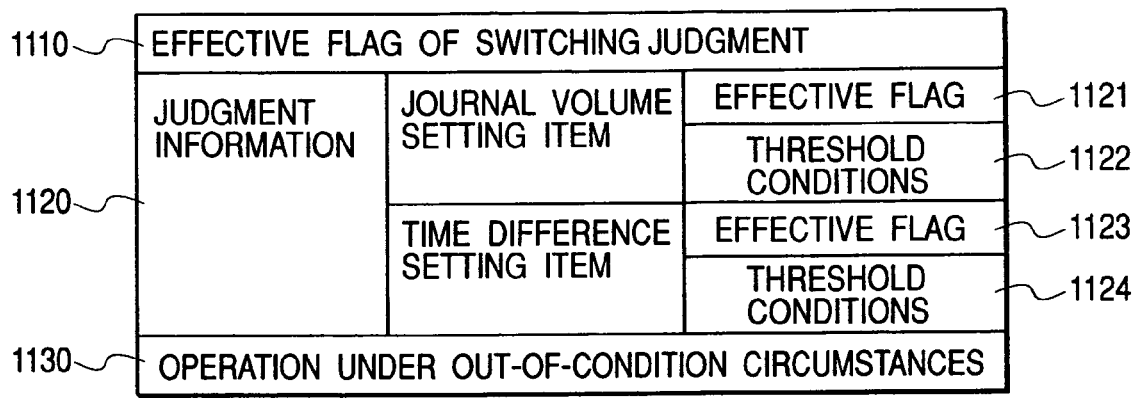
FIG. 9 is a diagram showing switching configuration information of a journal volume.

FIG. 3 is a diagram showing journal group management information. FIG. 4 is a diagram showing data volume management information. FIG. 5 is a diagram showing journal meta-information. FIG. 6 is a diagram showing correlations between a data volume and a journal volume. FIG. 7 is a diagram showing an internal structure of a journal data area 820 in a primary journal volume. FIG. 8 is a diagram showing an internal structure of a journal data area 820 in a secondary journal volume. FIG. 9 is a diagram showing switching configuration information of a journal volume.

The journal group management information is information used for managing a journal group and is stored in the control memories 145 of storage system 120.

Here, the term "journal group" implies a pair of volumes in which a data volume and a journal volume that stores a journal of the data volume are associated with each other.

The journal group management information contains, as shown in FIG. 3, a journal group ID 410, a latest journal sequence number (No.) 420, data volume information 430, journal volume information 440 and transfer group information 450.

The journal group ID 410 is an identifier which uniquely identifies a journal group. The latest journal sequence number 420 is the latest number created among consecutive numbers to be created for journals in the journal group.

The data volume information 430 contains data volume management information 431 of data volumes contained in the journal group. Details of the data volume management information will be described later.

The journal volume information 440 contains information on journal volumes and journal volume IDs for storage 444 which are contained in the journal group. Information of each journal volume contains a volume ID 441 identifying the volume, a first journal sequence number 442 which indicates the sequence number of the oldest journal among journals stored in the journal volume, and a last journal sequence number 443 which indicates the sequence number of the newest journal.

The journal volume ID for storage 444 is provided to indicate a journal volume in which a subsequent journal is stored, when a plurality of journal volumes are available in a journal group. In the primary storage system 120A, the journal volume ID 444 implies a journal volume that is used to store journal during a journal acquisition process, while in the secondary storage system 120B, the journal volume ID 444 implies a journal volume that is used as a transfer target of a journal during a journal transfer process. It should be noted, however, that, when only one journal volume exits, an ID of a journal volume that is used for storage and transfer is set in the journal volume ID for storage 444.

The transfer group information 450 contains a journal group ID 451 which is an identifier of a journal groups to be paired, a transfer-completed journal sequence number 452 which indicates to which journal the transfer to the secondary storage system is completed, a reflection-completed journal sequence number 453 which indicates to which the journal reflection process is completed in the secondary storage system 120B, and a pair status information 454 which indicates the status of transfer groups. It should be noted that a journal which has a sequence number subsequent to the transfer-completed journal sequence number 452 becomes the oldest journal. The secondary storage system (the primary storage system in the second and the fourth embodiment) specifies and uses a journal volume that contains the oldest journal as the journal volume. When a journal volume for transfer and a journal volume for storage coincide with each other, the journal volume containing the oldest journal and the journal volume indicated by the journal volume ID for storage 444 coincide with each other. On the other hand, as a result of a switching process, or if a journal volume for transfer and a journal volume for storage are differentiated from each other in advance, the journal volume containing the oldest journal and the journal volume indicated by the journal volume ID for storage 444 do not coincide with each other. The same applies to the secondary storage system 120B.

Here, the term "transfer group" implies that a transfer source journal group and a transfer target journal group are associated with each other and paired.

The reflection-completed journal sequence No. 453 is notified to the journal process management program 221 of the primary storage system 120A from the journal process management program 221 of the secondary storage system 120B.

The pair status 454 includes. "PAIR" which means that all data volumes available in a journal group are in a duplicated status and "COPY" which means that one or more data volumes available in a journal group are executing a differential copy (the differential copy will be described later). Further, there are two more statuses: a status of "SUSPEND" which means that all data volumes are in a suspend status without executing duplication and consistency is maintained for all data within the journal group; and a status of "SUSPEND-E" which means a status where consistency is not maintained in the journal group.

The data volume management information 431 is information used for managing a data volume, and as shown in FIG. 4, the information contains a volume ID 510 which identifies a data volume in a storage system, and pair volume information 520 which is information on paired data volumes.

The pair volume information 520 contains a storage system ID 521, a data volume ID 522 which identifies paired data volumes, a pair status 523 which shows a duplication status, an effective flag of differential bit map 524, and a differential bit map 525.

The storage system ID 521 is an identifier of a storage system in which paired data volumes exist, and the data volume ID 522 is a volume identifier in the storage system.

A data volume can be uniquely defined by combining the storage system ID 521 and the data volume ID 522.

The pair status 523 implies either status of the "PAIR" in which data volumes are in a duplicated status (a status where data consistency is maintained within a volume), the "COPY" which means that one or more data volumes available in a journal group are executing a differential copy, or the "SUSPEND" in which copying processes are discontinued to be in the suspend status due to blockage of a volume, a path, etc.

The effective flag of differential bit map 524 indicates whether a value of a differential bit map is effective. The differential bit map 525 is information that indicates an area in which the PVOL and SVOL data are different from each other. A data volume area is divided into a plurality of areas, and, if a data volume is updated under the SUSPEND status, a bit indicating the updated area is turned on. After establishing the SUSPEND status, a pair can be recovered to a duplicated status by duplicating only the bit-on area based on a bit map in which OR is removed from the respective differential bit maps 525 of the PVOL and the SVOL (differential copying). Copy transfer volume can be reduced by executing the differential copying. With the differential copying, the area in which copying is completed turns off the bit, and when all bits are turned off, then the differential copying is completed. Further, when a pair is created, the entire area of the PVOL can be copied to the SVOL by turning on all differential bit maps and applying differential copying (initial copying).

The journal meta-information is management information used to associate data with journals, and, as shown in FIG. 5, the meta-information contains data volume information 710 and journal information 720.

The data volume information 710 contains update time 711 which indicates data update time, storage data volume offset in journal group 712 which indicates a data volume whose data is to be updated falls on which data volume in a journal group, and a data storage address 713 which indicates a first address in which data on a data volume is stored.

The journal information 720 contains a journal data storage address 721 which indicates a first address in which journal data on a journal volume is stored, data length 722 of journal data, and a journal sequence number 723 which is one of serial numbers of journals in a journal group that is assigned when a journal is acquired.

The data volumes and the journal volumes that are associated with each other by the journal meta-information are shown in FIG. 6.

In general, the PVOL, the SVOL and a journal volume are each managed on a predetermined logical block basis (e.g., 512 KB). A logical block address (hereinafter referred to as an "LBA") is given to each of the logical blocks.

A primary journal volume 267A has a meta-data area 810 and a journal data area 820. In the meta-data area 810, the journal data 821A described earlier, or a copy of data 831A that is written in the PVOL by a write command, is stored. In the meta-data area 810, the meta-data 811A described earlier is stored. The meta-data contains a data storage address 812A of update data, and a storage address 813A of journal data.

A secondary journal volume 267B also has a meta-data area 810 and a journal data area 820 as is the case with the primary journal volume 267A. In the meta-data area 810, meta-data 811B that is transferred from a meta-data area of a primary journal volume is stored. In the journal data area 820, journal data 821B (associating with meta-data) that is transferred from a journal data area of the primary journal volume 267A is stored.

The meta-data 811B has information on data update that is performed in the PVOL, and address information 813B of the meta-data 811B indicates an address of the associated journal data 821B. Further, by copying the journal data 821B to an address of an SVOL 266 associated with the address 812B from the journal data area 820 of the secondary journal volume 267B, it is possible to reflect the update made in a PVOL 265 in the SVOL 266.

It is possible that each address is expressed by an LBA and data length is represented by the number of logical blocks. In addition, a location in which data is stored can be represented by a difference (offset) from a base address (first LBA) of an area in which the data is stored (journal data area or meta-data area). With the embodiment, data length of meta-data is set to a given length (64 bytes, for example), but data length of journal data is not constant since it depends on data to be updated by a write command.

When a journal group is defined, each of the storage systems 120 sets the meta-data area 810 and the journal data area 820 for the journal volume 267 to be set. More specifically, the first LBA and the number of blocks of each area are set.

Next, an internal structure of the journal data area 820 in a primary journal volume will be described.

The journal data area 820 contained in the primary journal volume is divided into a journal storage completed area 910 in which journal data is stored, and a purge completed area 920 in which journal data is not stored, or otherwise, journal data that can be purged is stored. The purge completed area 910 is an area that is enabled to release journal data stored therein following the transfer to the journal data to the secondary site, and the area can be used for storing new journal data of the PVOL 625.

FIG. 7 shows a status where a journal data area 900A and a journal data area 900B are stored in separate logical volumes respectively.

In the journal data area 900A, a journal with a first sequence number in volume 931A up to a journal with a last journal sequence number in volume 932A are stored, while in the journal data area 900B, a journal with a first sequence number in volume 931B up to a journal with a last sequence number in volume 932B are stored. When a journal is stored, it is always written in the first place in a volume.

A journal volume is repeatedly used in the same way as it is done for a cyclic buffer. More specifically, when the last logical block of a journal is used up, the first logical block is then used again. It should be noted, however, when a plurality of journal volumes are contained in a journal group, if the last logical block of a journal is used up, the first logical block of the subsequent journal volume is used. When the last logical block of the last journal volume is used up, then use of the first logical block of the first journal volume is resumed. It should be noted that, before the last logical block of a journal volume is used, it may be possible to switch an intermediate logical block over to the first logical block of the next journal volume. Switching of a storage target of a journal over to the next journal volume is called a "journal volume switching process."

In FIG. 7, after the journal area 900A is used up to the first journal sequence number in volume 931A, the journal volume is switched over to the first journal of the journal data area 900B. To that end, the first journal sequence number in volume 931A and the last journal sequence number in a volume 932B are uninterrupted. The journal volume switching process will be described in detail later.

A storage-completed sequence number 911 indicates the latest journal. A journal to be acquired next is given a journal sequence number having a value that is obtained by adding 1 to the storage-completed sequence number 911 and is stored in a purge area of the journal data area 900B. Here, a journal volume for storage implies a journal volume that has the journal data area 900B. A journal with a sequence number obtained by adding 1 to a transfer-completed sequence number 921 is the oldest journal. If the transfer-completed sequence number 921 is equal to the storage-completed sequence number 911, this means that the journal is empty.

Next, an internal structure of the journal data area 820 in the secondary journal volume will be described.

As shown in FIG. 8, the journal data area 820 contained in the secondary journal volume is divided into: a purge-completed area 1030 in which journal data that is already used for reflection of the journal to the SVOL 626 is stored (or, the journal data is not stored); area under reflection 1020 in which the journal data that is subject to journal reflection to the SVOL 626; a transfer completed area 1011 in which journal data that is the target for journal reflection and for journal transfer from the primary journal volume has been completed is stored; and area under transfer 1010 in which journal data under transfer from the primary journal volume is stored.

In a journal data area 1000A, a journal with a first sequence number in volume 931C up to a journal with a last journal sequence number in volume 932C are stored, while in the journal data area 1000B, a journal with a first sequence number in a volume 931D up to a journal with a last sequence number in volume 932D are stored. Here, journal volume switching occurs after the first sequence number in volume 931C has been stored, and therefore, the first sequence number in volume 931C and the journal with a last sequence number in volume 932D are uninterrupted.

A sequence number to be transferred 1012 indicates a first journal sequence number of a journal that is under transfer from the primary journal volume. Journals with the sequence number to be transferred 1012 and subsequent sequence numbers are transferred next and stored in a purge area of the journal data area 1000B. Here, a volume ID to be stored in the journal volume IDs for storage 444 shown in FIG. 3 indicates a journal volume having the journal data area 1000B which is a target volume for transfer. A transfer completed sequence number 1013 indicates a sequence number of a journal whose transfer process is completed last.

A sequence number to be reflected 1021 indicates the first sequence number of a journal targeted for journal reflection, or otherwise, the number indicates a sequence number of a journal whose reflection process is completed following the reflection-completed sequence number 1022.

Next, journal volume switching configuration information will be described.

The journal volume switching configuration information is management information used to switch journal volumes.

With the process according to the present invention, it is possible to switch journal volumes in both the primary site and the secondary site.

The journal volumes of the primary site 100A is switched by switching the logical volumes that are used for storing present-time journals in order to balance loads on (source) logical volumes used for storing and on logical volumes used for data transfer by present-time journals.

The journal volumes of the secondary site 100B is switched by switching the logical volumes that are used for transfer in order to balance loads on (target) logical volumes used for transfer and on logical volumes used for data recovery by present-time journals.

As shown in FIG. 9, the journal volume switching configuration information comprises effective flag of switching judgment 1110, judgment information 1120 and operation under out-of-condition circumstances 1130.

The effective flag of switching judgment 1110 is a flag for executing switching judgment process or not. If no journal volume switching judgment is executed, the effective flag of switching judgment 1110 is turned OFF.

Although the switching judgment at the primary site 100A may be performed at given timing, it is effective to performed the switching judgment when, after transfer of a journal of a certain volume is completed, a journal volume in which a journal to be transferred next is stored is used as a volume which stores a present-time journal. The switching judgment at the secondary site 100B can also be performed at given timing, but it is effective to perform the switching judgment when, after data reflection by a journal of a certain volume is completed, a journal volume in which a journal to be used for the reflection next is stored is used as a transfer target volume. Here, attention should be paid to the fact that the journal data has a sequential structure as used in FIGS. 7 and 8. Such switching judgment will be described in detail later.

The judgment information 1120 contains set values concerning non-transferred journal volume, and set values concerning time difference between the time when the oldest journal among non-transferred journals is updated and the time when judgment is made. Each set value contains an effective flags 1121 and 1123 to make the judgment criteria effective or not, and threshold conditions 1122 and 1124 for performing switching of volumes for storage.

For example, for the primary journal volume, when non-transferred journal volume is small, loads of journal processing would not constitute a big problem even if a logical volume used for storing a present-time journal coincides with a logical volume used for transfer. On the other hand, for the secondary journal volume, when a journal volume to be recovered is small, loads of journal processing would not constitute a big problem even if a logical volume used for data recovery by a present-time journal coincides with a logical volume used for transfer.

Consequently, for the case of the primary journal volume, the threshold conditions 1122 would include that non-transferred journal volume (difference between the storage-completed sequence number 911 and the transfer-completed sequence number 921) should exceed the preset threshold value, while for the case of the secondary journal volume, the threshold conditions 1124 would include that non-transferred journal volume time difference (difference of time between the update time of the journal with a sequence number obtained by adding 1 to a transfer completed sequence number 921 and the time when a judgment is made) should exceed the preset threshold value. Further, for the case of the secondary journal volume, the threshold conditions 1122 may include that the non-reflected journal volume (difference between the transfer completed sequence number 1013 and the reflection-completed sequence number 1022) should exceed the preset threshold value, or the threshold conditions 1124 may include that the non-reflected journal time difference (difference of time between the update time of the journal with a sequence number obtained by adding 1 to a reflection-completed sequence No. 1022 and the time when a judgment is made) should exceed the preset threshold value.

In such cases, for the primary journal volume, switching of journal volume for storage is executed, while for the secondary journal volume, switching of volume for transfer is executed.

In the operation under out-of-condition circumstances 1130, system operations for a situation that does not satisfy the conditions are described. Operations for a situation that does not satisfy the conditions include: for the primary journal volume, (1) journal transfer is interrupted, or (2) journal transfer is executed by using a journal volume that is used for storing the journal; or, for the secondary journal volume, (1) journal reflection is interrupted, or (2) journal reflection is executed by using a journal volume which is used as the transfer target.

In the primary site 100A, the journal switching configuration information is set by a user, when a journal group and the like are set, via the management terminal unit 130 or GUI of the maintenance terminal unit 122, and is then stored in the control memory 145. In the secondary site 100B, the journal switching configuration information is set in the similar way, and the information is stored in the control memory of the secondary storage system 120B.

(III) Outlined Processes of Data Processing System (III-1) Outlined Processes of Data Processing System First, outlined processes of a data processing system according to the first preferred embodiment of the present invention will be described with reference to FIG. 10.

Figure 10:
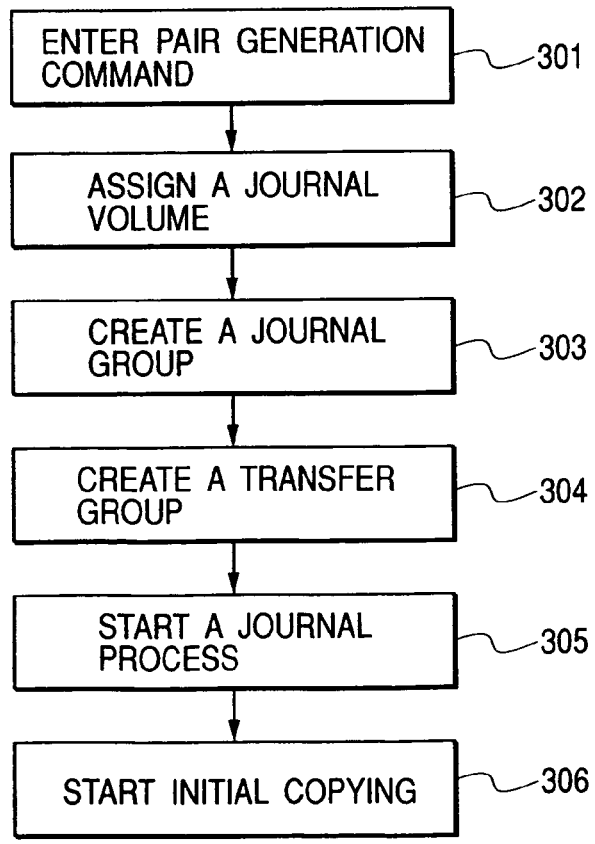
FIG. 10 is a flow chart showing outlined processes of a data processing system according to the first preferred embodiment.

FIG. 10 is a flow chart showing outlined processes of a data processing system according to the first embodiment.

First, a user enters a pair generation command to a storage system by using a graphical user interface (GUI) of the host 110, the control terminal unit 130 or the maintenance terminal unit 122 (Step 301).

The pair generation command associates the PVOL 625 of the primary storage system 120A which will be the copy source for data duplication with the SVOL 626 of the secondary storage system 120B which will be the duplication target of data to be stored in the PVOL 625 so as to form them into a pair.

Then, the journal process management program 221 of each site is used to control the primary site 100A so that a volume to store a journal associated with the PVOL 625 designated in the storage system 120A may be allocated, and to control the secondary site 100B so that a journal volume to store a journal associated with the SVOL 626 designated in the secondary storage system 120B may be allocated (Steps 302 and 303).

In the primary site 100A, a journal group is formed by the PVOL 625 and the journal volume area 627A that is assigned to the PVOL 625, while in the secondary site 100B, a journal group is formed by the SVOL 626 and the journal volume area 627B that is assigned to the SVOL 626. An aggregate of a plurality of volumes can be assigned to a journal volume when the journal group is formed.

The pair generation command also associates a journal group of the PVOL 625 with a journal group of the SVOL 626 to create a transfer group (Step 304). Journal volume switching information may be set when the journal group is set. The journal volume switching setting will be described in detail later.

It should be noted that, when a journal group is formed, assignment of data volume is not limited to a single data volume, but an aggregate of a plurality of data volumes may be assigned. Since data is updated in the aggregate of SVOLs in a similar way of updating data in the aggregate of the PVOLs, data consistency is maintained in the aggregate of the data volumes.

Next, after a transfer group is formed, journal processes are executed (Step 305). The journal processes imply journal acquisition, journal transfer, and journal reflection. The journal acquisition is started in the primary storage system 120, when the primary storage system receives from a use a command instructing acquisition of a journal (hereinafter referred to as the "journal acquisition start command"). The journal processes will be described in detail later.

On the other hand, data that had been stored in the PVOL 625 before the journal acquisition is started will not be transferred to the secondary storage system even when the journal transfer is started. It is necessary to independently copy such data (herein after referred to as the "initial data") to the SVOL 626 from the PVOL 625. A process to copy the initial data is called "initial copying." In the embodiment, initial copying which transfers the initial data to the SVOL 626 from the PVOL 625 is executed (Step 306). The initial data is transferred from the first area of volumes up to the last area of volumes in the PVOL 625.

(III-2) Detailed Journal Processes

Next, journal processes will be described in detail with reference to FIG. 11.

Figure 11:
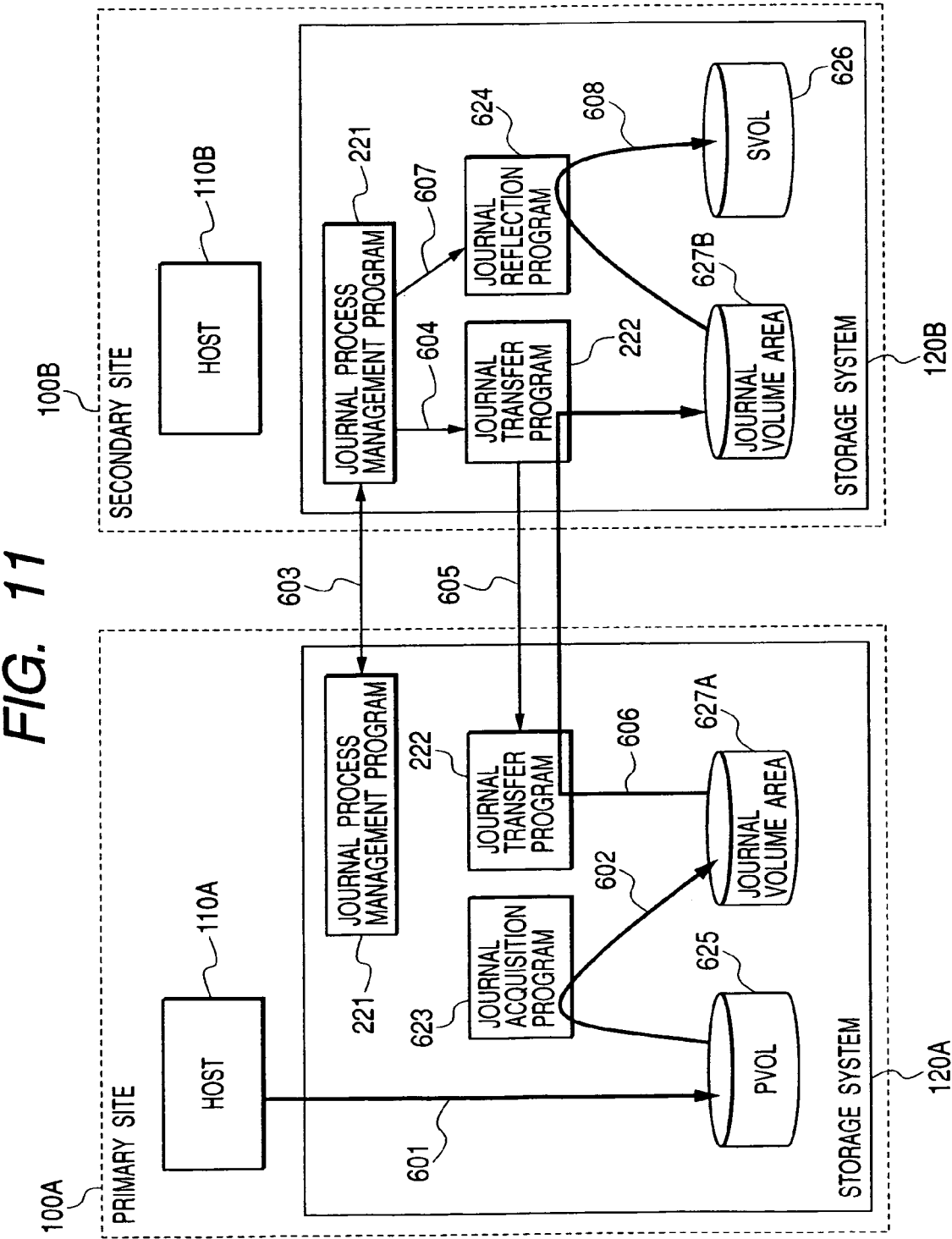
FIG. 11 is a diagram showing journal process operations according to the first preferred embodiment of the present invention.

FIG. 11 is a diagram showing journal process operations according to the first embodiment of the present invention.

The storage systems 120A and 120B execute the journal process management program 221 to control journal processes.

The primary storage system 120A executes the journal acquisition program 623 out of the journal acquisition/reflection program 223. The primary storage system 120A, by executing the journal acquisition program 623, stores a duplicated copy of data to be written to the PVOL 625 as journal data. In addition, the primary storage system 120A also stores meta-data in the journal volume area 627A as part of journals. The above-stated processes constitute the journal acquisition processes.

On the other hand, the secondary storage system 120B executes journal reflection processes by executing the journal reflection program 624 out of the journal acquisition/reflection program 223. The journal reflection program 624 recovers data based on journals stored in the journal volume area 627B and reflects data updated in the PVOL 625 in the SVOL 626.

FIG. 11 shows processes wherein the above-stated processes are executed with the system illustrated in FIG. 2.

Upon starting journal acquisition processes of the PVOL 625, the primary storage system 120A creates a journal according to writing (an arrow-headed line 601) from the primary host 110A to the PVOL 625, and stores the journal thus created in the journal volume area 627A (an arrow-headed line 602). Here, the journal acquisition program acquires information such as a latest journal sequence number and a journal volume ID for storage from journal group management information stored on the control memory 145 of the primary storage system 120A, determines the target for journal storage, and creates meta-data information.

The secondary storage system 120B executes the journal process management program 221, and acquires information related to journal creation status (for example, capacity of a journal in a journal volume, the oldest time of journals, etc.) (an arrow-headed line 603).

The secondary storage system 120B executes the journal process management program 221, and issues a request for journal transfer to the journal transfer program 222 of the secondary storage system 120B according to entry of instruction by a user via a GUI or a predetermined schedule (for example, at a time when a certain volume of journals is stored in a journal volume in the primary storage system 120A, at regular periods, etc.) (an arrow-headed line 604).

The request for journal transfer contains a journal to be copied (which may be a plurality of journals), a journal volume in which the above-stated journal is stored, information designating the storage system 120 (the primary storage system 120A here) which has the above-stated journal volume, and information designating a journal volume in which the copied journal is stored. Such information is created based on the information that the journal process management program 221 has acquired from the journal management information on the control memory 145.

The journal transfer program 222, upon receiving a request for journal transfer, issues a read command to the primary storage system 120A (an arrow-headed line 605). The primary storage system 120A, upon receiving the read command, transmits a journal designated by the read command to the secondary storage system 120B (an arrow-headed line 606).

An area of a journal volume, in which the journal that is transmitted to the primary storage system 120B is stored, of the primary storage system 120A is purged or cleared, enabling storage of a new journal. It should be noted that the purging is not needed to be executed immediately after the transmission. Purging may be executed periodically, or may be done according to a user's instruction.

The secondary storage system 120B, upon receiving a journal, stores the received journal in the journal volume area 627B that is designated by the request for journal transfer.

Thereafter, the journal process management program 221 of the secondary storage system 120B issues a request for journal reflection to the journal reflection program 624 of the secondary storage system 120B (an arrow-headed line 607). The journal reflection program 624, upon receiving the request for journal reflection, recovers data in the SVOL 626 based on the journal of the journal volume area 627B (an arrow-headed line 608). It should be noted that the area in which the journal used for recovery is purged, enabling storage of a new journal.

(III-3) Journal Volume Switching Processes

Figure 13:
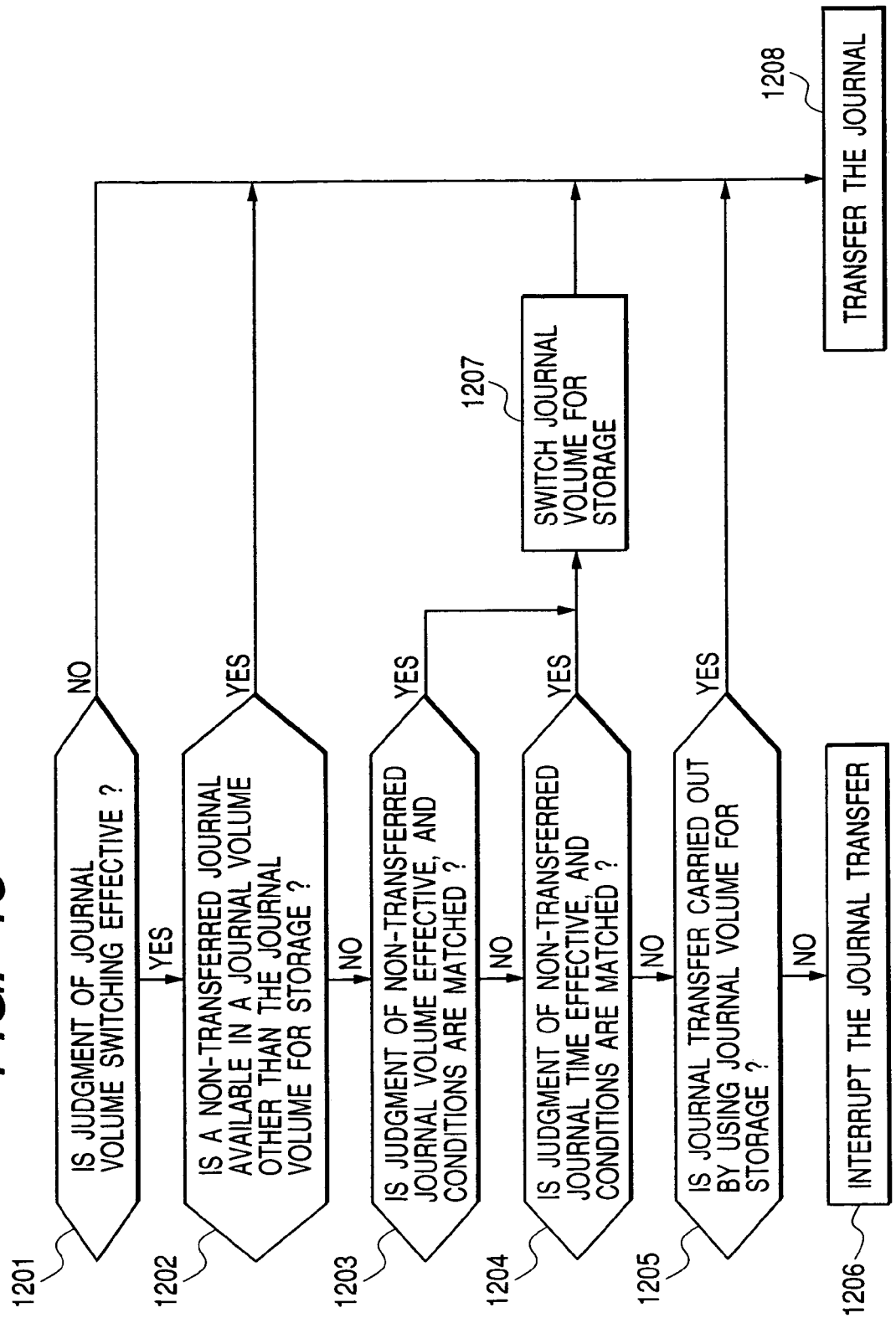
FIG. 13 is a flow chart showing a switching process of a primary journal volume.
Figure 14:
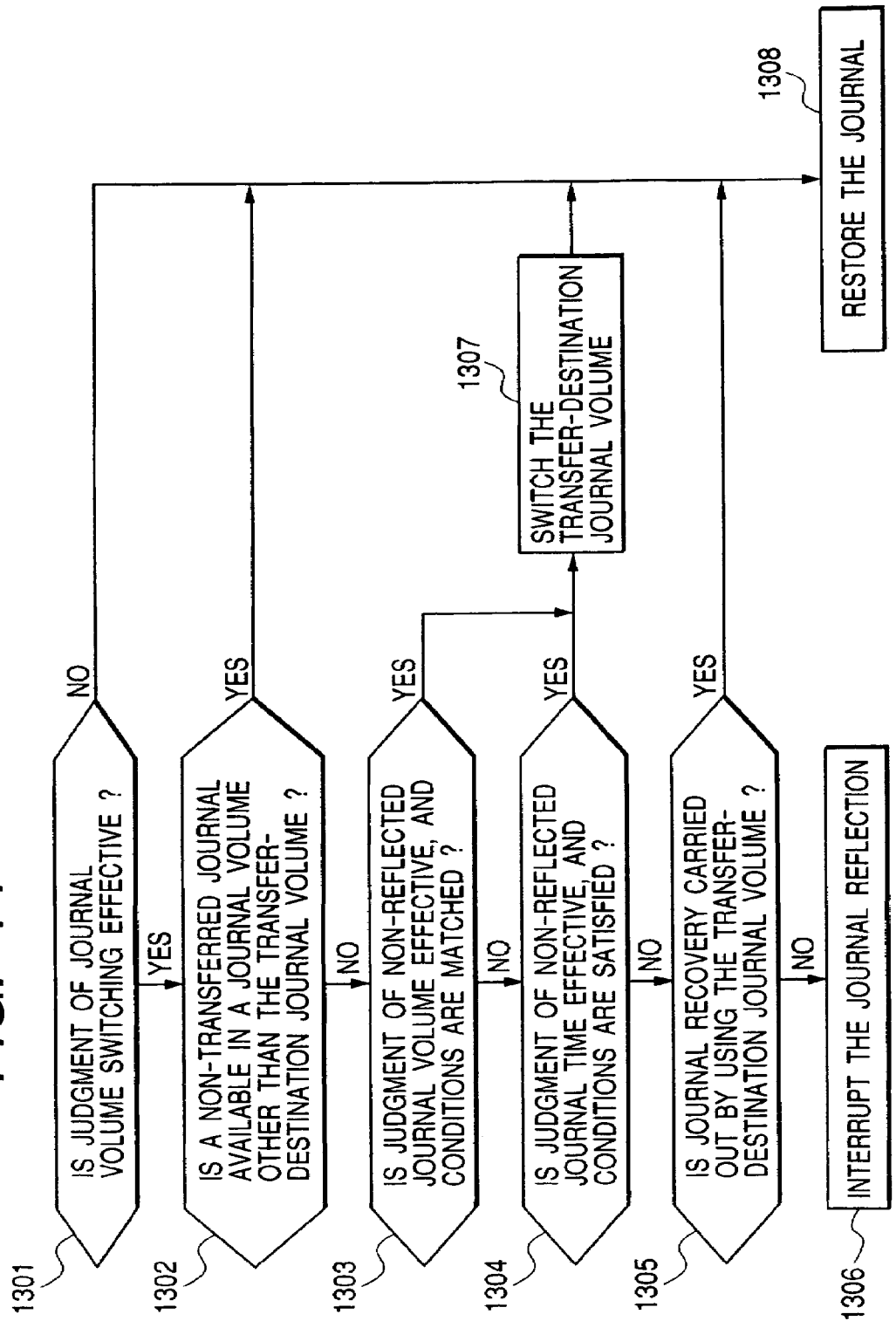
FIG. 14 is a flow chart showing a switching process of a secondary journal volume.

Next, journal volume switching processes will be described with reference to FIGS. 12 to 14.

Figure 12:
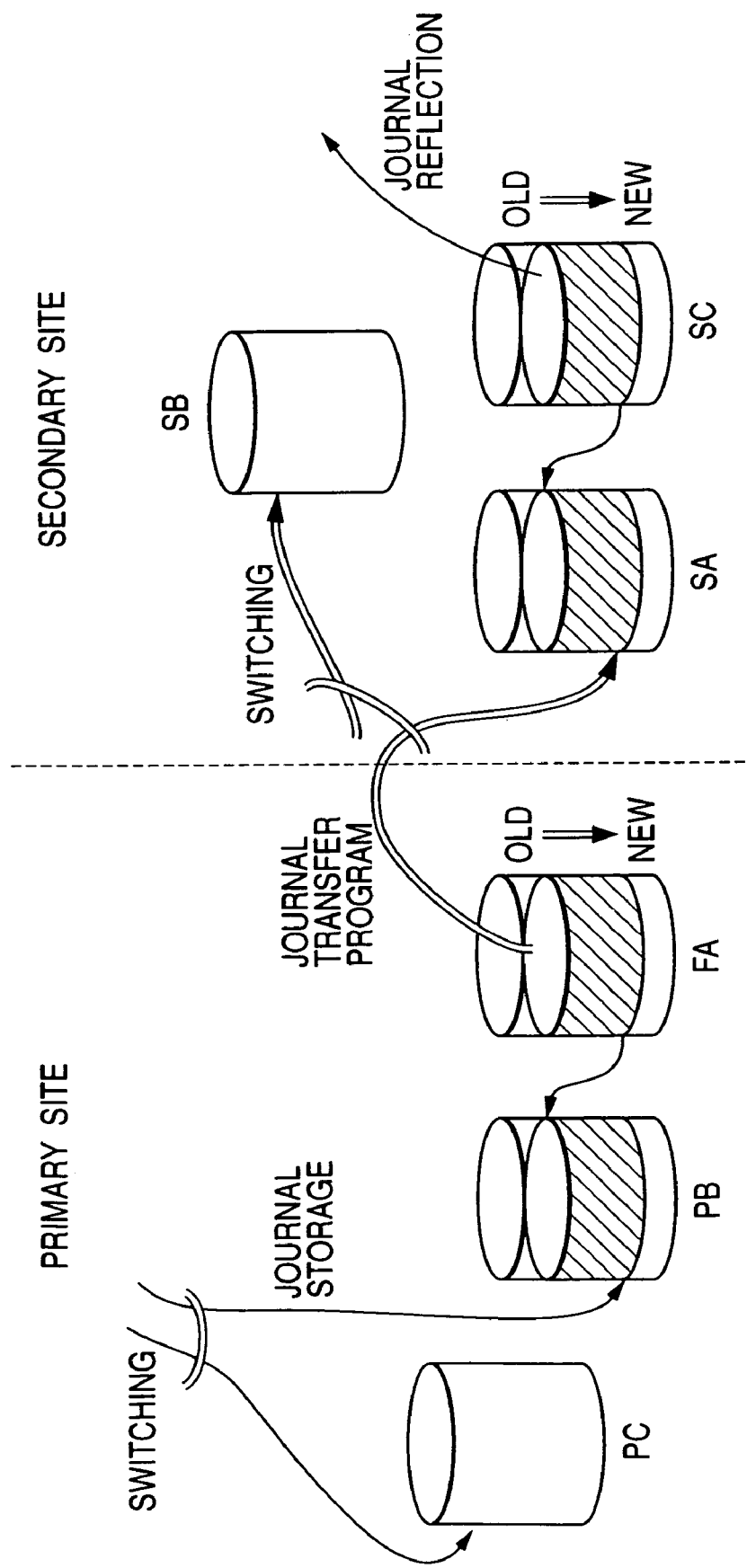
FIG. 12 is a conceptual diagram for explaining switching of a journal volume.

FIG. 12 is a conceptual diagram explaining switching of a journal volume. FIG. 13 is a flow chart showing a switching process of a primary journal volume. FIG. 14 is a flow chart showing a switching process of a secondary journal volume.

As already stated in the above, with the present invention, switching of journal volume is executed to reduce system loads by avoiding that logical volumes used for journal storage, journal reflection and journal transfer become identical in the process of transferring the journals to the secondary site 100B from the primary site 100A.

Now, as shown in FIG. 12, it shall be assumed that a logical volume PA, a logical volume PB and a logical volume PC are available in the primary site 10A, wherein the logical volume PB is used for storing a journal, and the logical volume PA is used for transfer as the transfer source logical volume.

It shall also be assumed that, for the order of journals, those located at the upper part of a volume is older, and the last journal of the logical volume PA is continuously connected to the first journal of the logical volume PB.

Now, when transfer of journals in the logical volume PA is completed, the next step will be transfer of journals in the logical volume PB, and at this time, a logical volume for storing journals will be switched to the logical volume PC from the logical volume PB.

Further, it shall be assumed that a logical volume SA, a logical volume SB and a logical volume SC are available in the secondary site 110B, wherein the logical volume SC is used reflecting a journal, and the logical volume SA is used for transfer as the transfer target logical volume.

It shall also be assumed that, for the order of journals, those located at the upper part of a volume is older, and the last journal of the logical volume SC is continuously connected to the first journal of the logical volume SA.

In such a case, when reflection of journals in the logical volume SC is completed, the next step will be reflection of journals in the logical volume SA, and at this time, the target logical volume for transferring journals will be switched to the logical volume SB from the logical volume SA.

In the above, an example wherein switching is carried out at such timing that all journals in a logical volume for journal transfer and a logical volume for journal reflection are transferred or reflected is shown. However, switching of journal volumes may be executed following a switching command that is entered by a user. Further, the switching may be executed periodically or at predetermined hours. Furthermore, the switching may be carried out only when predetermined conditions are satisfied via an interface of the host 110, the management terminal unit 130 or the maintenance terminal unit 122.

In addition, in the primary site 100A, the switching may be executed at such timing that accepts a command for requesting journal transfer as shown by the arrow-headed line 605 in FIG. 11. Alternatively, in the secondary site 100B, the switching may be executed at such timing of initiating journal transfer.

More specifically, in the primary site 100A, when there are a plurality of primary journal volumes, such switching of journal volume can be realized by controlling the balance between the storage-completed journal sequence number 911 and the transfer-completed journal sequence number 921 shown in FIG. 7, thus distinguishing a journal volume to be used for journal acquisition from a journal volume to be used for journal transfer.

Further, in the secondary site 100B, when there are a plurality of secondary journal volumes, it is possible to distinguish a journal volume to be used for journal reflection from a journal volume to be used for journal transfer by controlling the balance between the reflection-completed journal sequence number 1022 and the journal sequence number to be transferred 1012.

It should be noted that, in the primary site 100A, when a journal which is subjected to journal transfer (hereinafter referred to as a "non-transferred journal") is not in a volume except a journal volume that is used for journal acquisition (more specifically, when the last journal sequence number in volume 932B of a journal volume for storage is a number that is obtained by adding 1 to the transfer completed journal sequence number 921), if switching of the journal volume for storage is not executed, then journal acquisition and journal transfer will be performed for one and the same journal volume.

Next, primary journal volume switching processes will be described according to the flow of a flow chart illustrated in FIG. 13.

When journal transfer is executed, a flag of journal volume switching judgment is checked (Step 1201).

If the switching judgment is not effective, then the journal transfer is executed (Step 1208). If the switching judgment is effective, a check is made as to whether any non-transferred journal exists in a journal volume except a journal volume for storage (Step 1202). If any non-transferred journal exists, the journal transfer of the journal volume is executed (Step 1208). If any non-transferred journal does not exist, a check is made as to whether a judgment based on non-transferred journal volume is effective and the judgment satisfies threshold conditions (Step 1203). If the judgment is effective and satisfies the conditions, then the journal volume for storage is switched to the subsequent journal volume (Step 1207), and journal transfer is executed (Step 1208). If the judgment of journal volume is ineffective or does not satisfy the conditions, a check is made as to whether a judgment based on time difference between the oldest update time of the non-transferred journal and present time is effective and the judgment satisfies the threshold conditions (Step 1204). If the judgment is effective and satisfies the conditions, then the journal volume for storage is switched to the subsequent journal volume (Step 1207), and journal transfer is executed (Step 1208). If the time difference judgment is ineffective or does not satisfy the conditions, the preset information is reflected (Step 1205), and journal transfer is executed by using a journal volume for storage (Step 1208), or journal transfer is interrupted until the next request for journal transfer is issued (Step 1206). When the journal volume for storage is switched in Step 1207, the storage controller 140 of the primary storage system 120A re-writes the ID of a journal volume for storage of journal group management information stored in the control memory 145 to information indicating a new switching-destination journal volume.

Next, secondary journal volume switching processes will be described according to the flow of a flow chart illustrated in FIG. 14.

When journal reflection is executed, a flag of journal volume switching judgment is checked (Step 1301). If the switching judgment is not effective, then the journal reflection is executed (Step 1308). If the switching judgment is effective, a check is made as to whether any non-reflected journal exists in a journal volume except a journal volume for storage (Step 1302). If any non-reflected journal exists, the journal reflection of the journal volume is executed (Step 1308). If any non-reflected journal does not exist, a check is made as to whether a judgment based on non-reflected journal volume is effective and the judgment satisfies threshold conditions (Step 1303). If the judgment is effective and satisfies the conditions, then the transfer-destination journal volume is switched to the subsequent journal volume (Step 1307), and the journal reflection is executed (Step 1308). When the transfer-destination journal volume is switched in Step 1307, the storage controller 140 of the secondary storage system 120B re-writes the ID of a journal volume for storage of journal group management information stored in the control memory 145 to information indicating a new switching-destination journal volume. If the judgment of journal volume is ineffective or does not satisfy the conditions, a check is made as to whether a judgment based on time difference between the oldest update time of the non-reflected journal and present time is effective and the judgment satisfies the threshold conditions (Step 1304). If the judgment is effective and satisfies the conditions, then the transfer-destination journal volume is switched to the subsequent journal volume (Step 1307), and the journal reflection is executed (Step 1308). If the time difference judgment is ineffective or does not satisfy the conditions, the preset information is reflected (Step 1305), and journal reflection is executed by using a journal volume for storage (Step 1305), or journal reflection is interrupted until the next request for journal reflection is issued (Step 1306).

Second Embodiment

Hereinafter, a second preferred embodiment according to the present invention will be described with reference to FIG. 15.

Figure 15:
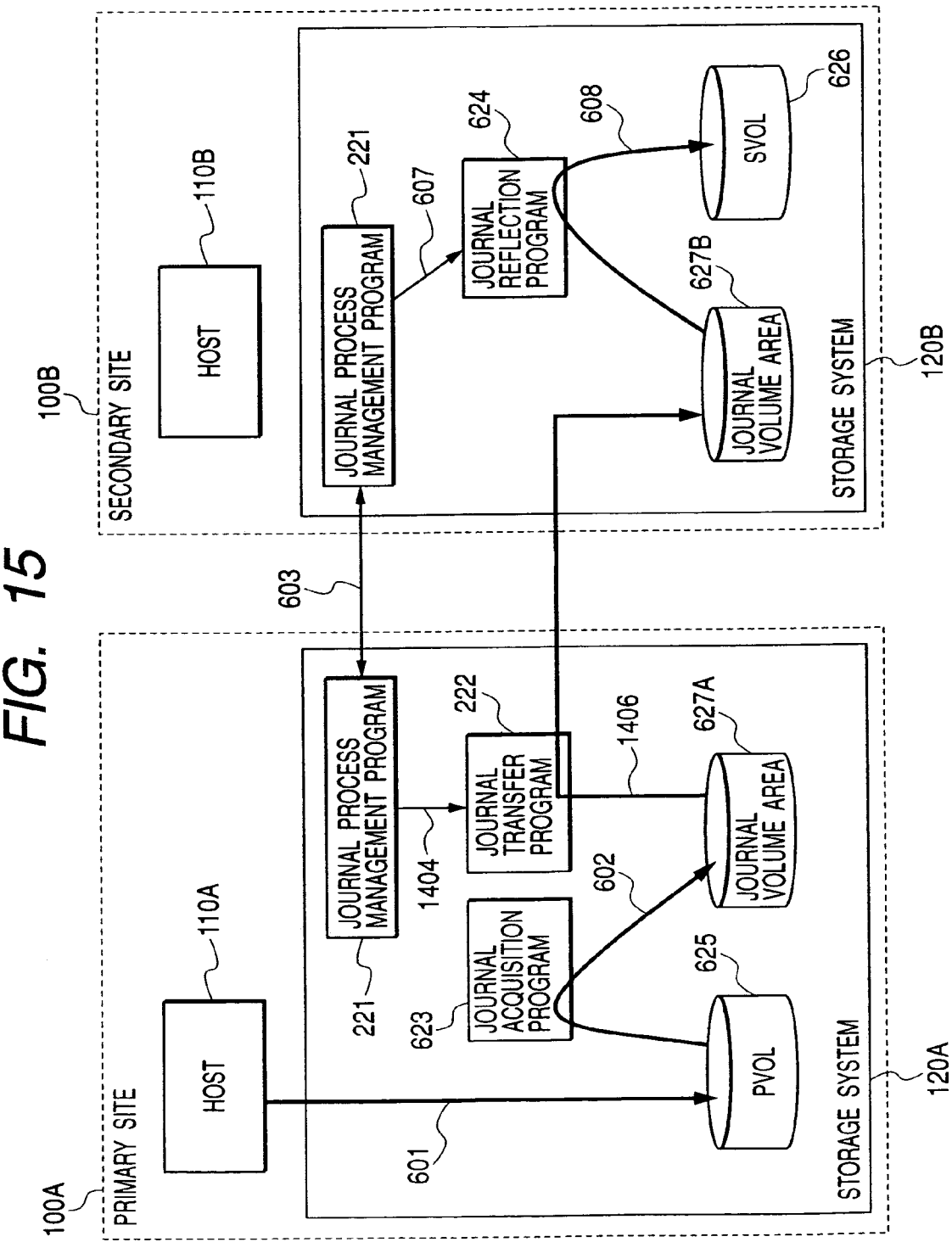
FIG. 15 is a diagram showing journal process operations according to a second preferred embodiment of the present invention.

FIG. 15 is a diagram showing journal process operations according to the second embodiment of the present invention.

In the journal processes according to the first embodiment, the journal transfer process is performed such that the secondary storage system 120B issues a read command requesting the primary storage system 120A to execute journal transfer as shown in FIG. 11 (the arrow-headed line 605). In the second embodiment, journal transfer is executed in such a way as that the primary storage system 120A issues a write command to the secondary storage system 120B, not in such a way as that the primary storage system 120A waits for a read command issued by the secondary storage system 120B.

First, in the primary site 100A, journal acquisition for updating the PVOL data (an arrow-headed line 601) is carried out in the way similar to that of the first embodiment (an arrow-headed line 602). The journal process management program 221 of the primary storage system 120A issues a request for journal transfer to the journal transfer program 222 (an arrow-headed line 1404). The journal transfer request contains a journal volume in which a journal to be transmitted to the storage system 120B is stored, information designating the storage system 120B, information designating a journal volume which should store the above-stated journal in the storage system 120B, etc. Such information is acquired from journal group management information stored in the control memory 145.

The journal transfer program 222, upon receiving the request for journal transfer, transmits a journal designated by issuing a write command to the secondary storage system 120B to the secondary storage system 120B (an arrow-headed line 1406). The secondary storage system 120B stores the journal received as a write command from the primary storage device 120A in the area of the secondary journal volume designated by the command.

Thereafter, journal reflection (Step 608) in the secondary site 100B is carried out in the way similar to that of the first embodiment. In addition, journal volume switching in the second embodiment is carried out in the way similar to that of the first embodiment.

Third Embodiment

Next, a third preferred embodiment according to the present invention will be described with reference to FIG. 16.

Figure 16:
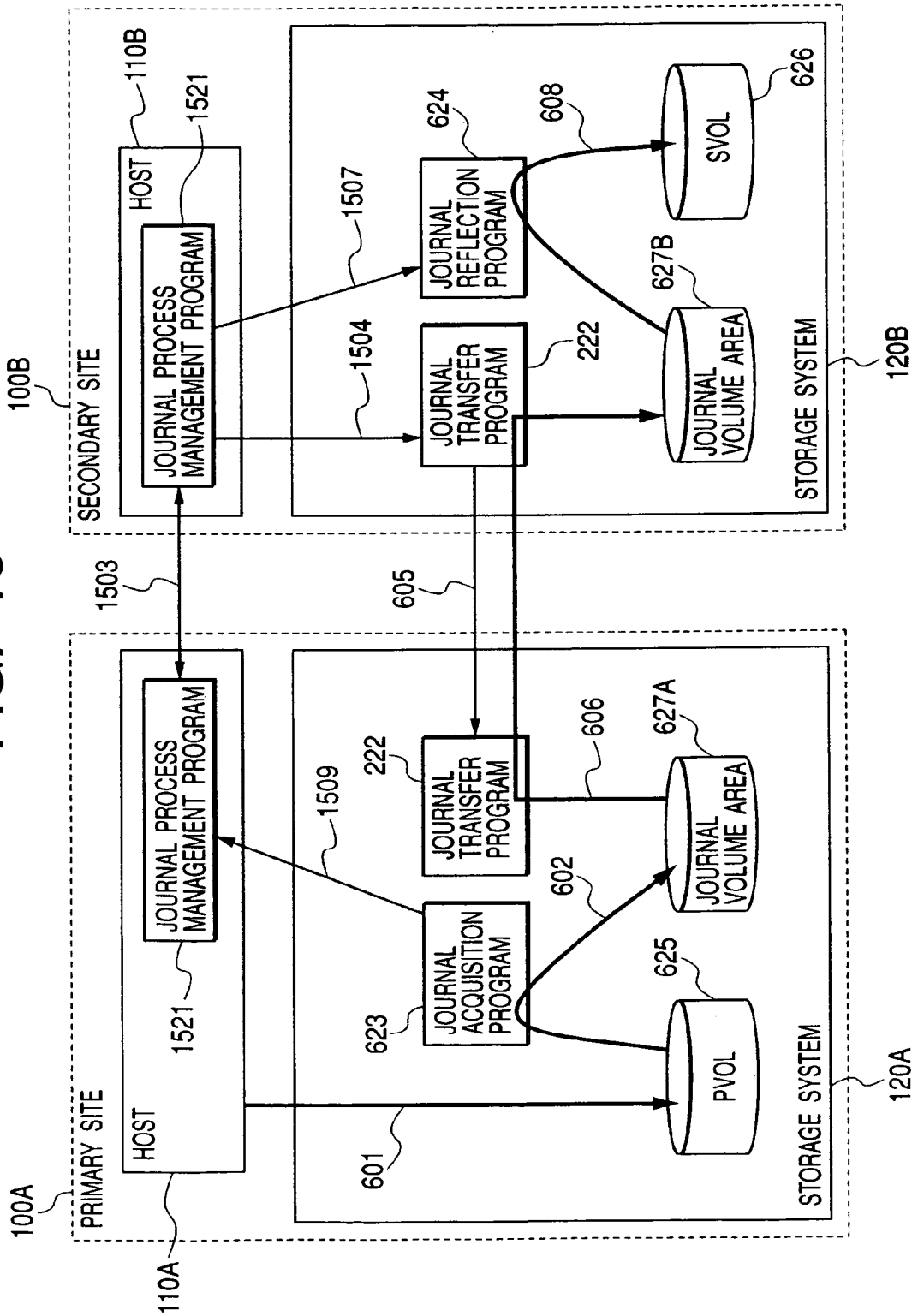
FIG. 16 is a diagram showing journal process operations according to a third preferred embodiment of the present invention.

FIG. 16 is a diagram showing journal process operations according to the third embodiment of the present invention.

The data processing system of the embodiment differs from that of the first preferred embodiment in, as shown in FIG. 16, that a journal process management program 1521 is not contained in the storage systems 120, but in the hosts 110. The journal process management programs 1521 execute communication with each other via a communication line that connects the primary host 110A and the secondary site 110B.

First, in the primary site 100A, journal acquisition for updating the PVOL data (the arrow-headed line 601) is carried out in the way similar to that of the first embodiment (the arrow-headed line 602).

The primary host 110A acquires information concerning journal creation status (e.g., capacity of a journal) from journal volume management information stored in the control memory 145 of the primary storage system 120A by executing the journal process management program 1521 and issuing a given command (hereinafter referred to as the "journal creation status acquisition command") (an arrow-headed line 1509).

The information concerning journal creation status acquired by the primary host 110A is notified to the secondary host 110B (an arrow-headed line 1503)

The secondary host 110B executes the journal process management program 1521 and issues a request for journal transfer, according to an entry designated by a user via a GUI or predetermined schedule (for example, when journals exceeding a given amount are stored in the primary storage system 120A, or at a regular period of time) to the primary storage system 120B (an arrow-headed line 1504).

The request for journal transfer contains a journal to be copied, a journal volume in which the journal is stored, information designating the storage system 120 which has the journal volume, and information designating a journal volume in which the copied journal is to be stored.

The secondary storage system 120B, upon receiving the request for journal transfer, issues a read command to the primary storage system 120A by executing the journal transfer program 222. The primary storage system 120A, upon receiving the read command, transmits the journal designated by the read command to the secondary storage system 120B (the arrow-headed line 606). The area in which the journal transmitted to the secondary storage system 120B is purged or cleared, thus enabling the use for storing a new journal.

The secondary storage system 120B, upon receiving the journal, stores the received journal in the journal volume area 627B that is designated by the request for journal transfer.

Thereafter, the secondary host 110B issues a request for journal reflection to the secondary storage system 120B (an arrow-headed line 1507).

The secondary storage system 120B, upon receiving the request for journal reflection, executes the journal reflection program 624 and recovers data from the journal volume area 627B to the SVOL 626 (an arrow-headed line 608). The area in which the reflection-completed journal is stored is purged, thus enabling the use for storing a new journal.

The journal volume switching in the embodiment is carried out in a way similar to the journal volume switching in the first embodiment.

Fourth Embodiment

Next, a fourth preferred according to, the present invention will be described with reference to FIG. 17.

Figure 17:
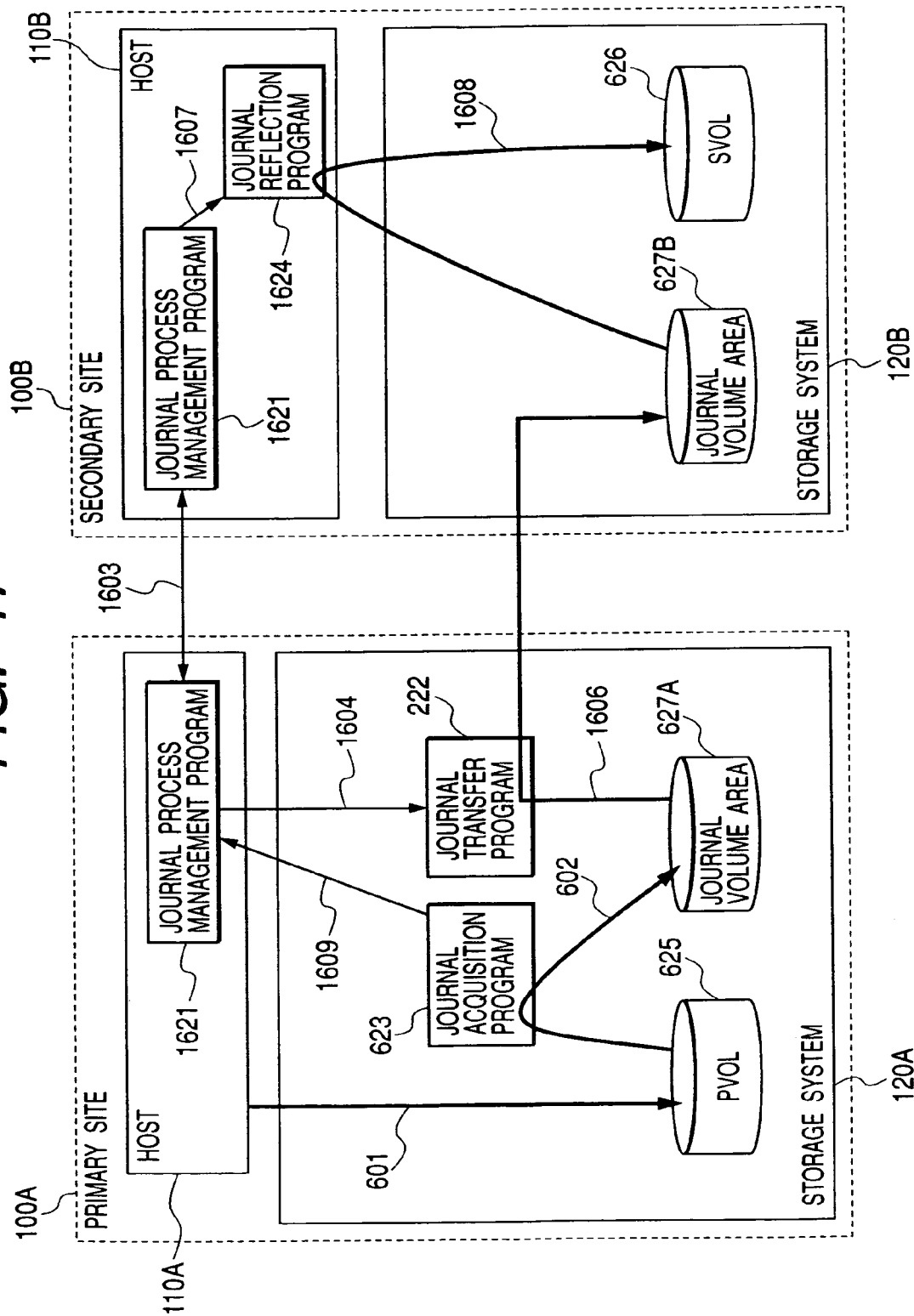
FIG. 17 is a diagram showing journal process operations according to a fourth preferred embodiment of the present invention.

FIG. 17 is a diagram showing journal process operations according to the fourth embodiment of the present invention.

The data processing system of the embodiment differs from that of the first embodiment in the point that, in the journal transfer process as shown in FIG. 17, the primary storage system 120A does not wait for a read command from the secondary storage system 120B, but the system 120A issues a write command to write data to the secondary storage system 120B. In addition, the data processing system of the embodiment also differs from that of the first embodiment in the point that a journal process management program 1621 is executed not on the storage systems 120, but on the hosts 110. Further, the data processing system also differs from that of the first embodiment in the point that the secondary storage system 120B does not execute the journal reflection, but the secondary host 110B reads a journal to be used for recovery from the secondary journal volume area 627B and recovers data of the SVOL 626. In the embodiment, the journal reflection program is executed on the secondary host 110B.

With the embodiment, a general storage device that has no special functions can be used for the secondary storage system 120B, since the principal unit to execute journal transfer is the primary storage system 120A and journal reflection is executed by the secondary host 110B.

In the primary site 100A, journal acquisition (the arrow-headed line 602) for updating the PVOL data (the arrow-headed lien 601) is executed in a way similar to that of the first embodiment.

The primary host 110A acquires information concerning journal creation status (e.g., capacity of a journal) from journal group volume management information stored in the control memory 145 of the primary storage system 120A by executing the journal process management program 1621 and issuing a journal creation status acquisition command (an arrow-headed line 1609).

The information concerning journal creation status acquired by the primary host 110A is notified to the secondary host 110B (an arrow-headed line 1603).

The primary host 110A executes the journal process management program 1521 and issues a request for journal transfer, according to an entry designated by a user via a GUI or predetermined schedule (for example, when journals exceeding a given amount are stored in the primary storage system 120A, or at a regular period of time) to the primary storage system 120A (an arrow-headed line 1604).

The request for journal transfer contains a journal volume in which a journal to be transmitted to the secondary storage system 120B is included, information designating the storage system 120B, information designating the journal, etc.

The primary storage system 120A, upon receiving the request for journal transfer, transmits the designated journal to the secondary storage system 120B by issuing a write command to the secondary storage system 120B (an arrow-headed line 1606).

The secondary storage system 120B stores the journal received as a write command from the primary storage system 120A in the area of the secondary journal volume designated by the write command.

The secondary host 110B, by executing a journal reflection program 1624, reads a journal from the secondary journal volume area 627B, and recovers data in the SVOL 626 (an arrow-headed line 1608).

The secondary journal group is managed by the secondary host 110B so that the host 110B notifies information required for creating a request for journal transfer (information on journal volume for storage, etc.) of the primary host 110A. The area in which the reflection-completed journal is stored is purged, thus enabling the use for storing a new journal.

The journal volume switching in the embodiment is carried out in a way similar to the journal volume switching in the first embodiment.

[Features of the Data Processing System of the Present Invention in Terms of the Above Preferred Embodiments]

The above data processing system of the present invention is configured such that a storage system executes journal acquisition/reflection and transfer while a host or a storage system executes journal management and copy status management. With the configuration, actual data transfer for data duplication between the primary site and the secondary site is executed via a fiber-optic cable between the storage systems. Thus, it is possible to minimize traffics in a general communication line between hosts, and it is also possible to improve copying performance since data transfer can be performed in a high-speed line.

Further, the storage system has a function of writing a journal to another storage system by using a write command, and a host reads the journal for recovery. Thus, it is possible to realize data duplication without giving any special functions to the storage system in the secondary site.

Furthermore, a journal group has a plurality of journal volumes, journal volumes for storage are switched, journal acquisition/transfer operations are executed in the primary site and journal transfer/reflection operations in the secondary site for different journal volumes. Thus, it is possible to achieve load balancing on access to a journal volume. As a result, delays in volume reading and writing caused by load concentration on a volume can be reduced, thus enabling improved system as a whole.

What is claimed is:

1. A data processing system, comprising:
    a primary site which includes a first computer and a first storage system connected to said first computer, said first storage system having a first logical volume for storing data sent from said first computer, said first logical volume related to at least one disk drive in said first storage system; and
    a secondary site which includes a second computer and a second storage system connected to said second computer, said second storage system having a second logical volume related to at least one disk drive in said second storage system, said second logical volume forming a pair relationship of a remote copy process with said first logical volume and storing data already stored in said first logical volume;
    wherein,
    said first storage system and said second storage system are connected to each other via a communication line;
    said first storage system records update history of data as a journal in a storage device stores update data to be stored in said first logical volume into at least one of third logical volumes, and transfers said update data stored in said at least one of third logical volumes to said second storage system via said communication line in such a way that said second computer is not in a transport path of said transferred update data from said first storage system to said second storage system;
    said second storage system stores said transferred update data into said second logical volume; and
    said at least one of said third logical volumes is switched to another one of said third logical volumes during said remote copy process.

2. A data processing system according to claim 1, wherein said second storage system executes data recovery based on said stored transferred update data.

3. A data processing system according to claim 1, wherein said switching is made at a time as designated by a user.

4. A data processing system according to claim 1, wherein said switching is executed at a time when transfer of the logical volume in which the update data for transfer to said secondary site is stored is completed.

5. A data processing system according to claim 1, wherein said transferred update data in said second storage system is stored in a plurality of logical volumes, and
    while the update data is transferred to a certain logical volume, a transfer-target logical volume is switched to another logical volume.

6. A data processing system according to claim 5, wherein said switching is made at a time as designated by a user.

7. A data processing system according to claim 5, wherein said second storage system recovers data based on said stored transferred update data, and
    said switching is made at a time when all logical volumes which store update data used for recovery are recovered.

8. A data processing system according to claim 1, wherein said second storage system acquires information related to update data recorded in said first storage system, and
    said second storage system issues a command requesting said first storage system to send said update data.

9. A data processing system according to claim 8, wherein said update data recorded in a storage device of said first storage system is stored in a plurality of logical volumes,
    a logical volume for storage is switched to another logical volume, while the update data is stored in a certain logical volume, and
    said switching is made at a time when a command for requesting dispatch of said update data is received from said second storage system.

10. A data processing system according to claim 8, wherein said transferred update data in said second storage system is stored in a plurality of logical volumes,
    a transfer-target logical volume is switched to another logical volume, while the update data is transferred to a certain logical volume, and
    said switching is made at a time when said update data transfer is started at said first storage system.

11. A data processing system according to claim 1, wherein:
    said at least one of said third logical volumes is switched to said another one of said third logical volumes at each time period.

12. A data processing system according to claim 1, wherein:
    said at least one of said third logical volumes is switched to said another one of said third logical volumes if update data stored in said at least one of said third logical volumes has been transferred.

13. A data processing system according to claim 1, wherein:
    said at least one of said third logical volumes is switched to said another one of said third logical volumes if amount of update data stored in said at least one of said third logical volumes is equal or over a value.

14. A data processing system according to claim 1, wherein:
    said second storage system stores said transferred update data into at least one of fourth logical volumes and reads said stored update data from said at least one of fourth logical volumes and writes said read update data to said second logical volume; and said at least one of said fourth logical volumes is switched to another one of said fourth logical volumes.

15. A data processing system according to claim 14, wherein:
said at least one of said fourth logical volumes is switched to said another one of said fourth logical volumes if said update data stored in said at least one of said fourth logical volumes has been written to said second logical volume.

16. A data processing system according to claim 14, wherein:
said at least one of said fourth logical volumes is switched to said another one of said fourth logical volumes if amount of update data stored in said at least one of said fourth logical volumes is equal or over a value.

17. A data processing system, comprising:
a primary site which includes a first computer and a first storage system connected to said first computer, said first storage system having a first logical volume for storing data sent from said first computer, said first logical volume related to at least one disk drive in said first storage system; and
a secondary site which includes a second computer and a second storage system connected to said second computer, said second storage system having a second logical volume related to at least one disk drive in said second storage system, said second logical volume forming a pair relationship of a remote copy process with said first logical volume and storing data already stored in said first logical volume; wherein,
said first computer and second computer are connected to each other via a first communication line,
said first storage system and said second storage system are connected to each other via a second communication line,
said first storage system stores update data to be stored in said first logical volume into at least one of third logical volumes,
said first computer acquires information related to said update data stored in said at least one of third logical volumes from said first storage system and transmits the information to said second computer via said first communication line,
said first storage system transfers said update data to said second storage system via said second communication line in such a way that said second computer is not in a transport path of said transferred update data from said first storage system to said second storage system,
said second storage system stores the transferred update data into said second logical volume; and
said at least one of said third logical volumes is switched to another one of said third logical volumes during said remote copy process.

18. A data processing system according to claim 17, wherein said second storage system issues a command requesting said first storage system to send said update data.

19. A data processing system according to claim 17, wherein data recovery in said second storage system is executed by a recovery program to be executed on said second computer based on said transferred update data.

20. A data processing system, comprising:
a primary site which includes a first computer and a first storage system connected to said first computer; and
a secondary site which includes a second computer and a second storage system connected to said second computer; wherein,
said first storage system and said second storage system are connected to each other via a communication line,
said first storage system includes a first storage controller and a first storage device,
said first storage controller executes a journal acquisition program which records data update history in said first storage device as a journal, and a journal transfer program which transfers said journal to said second storage system via said communication line,
said second storage system includes a second storage controller and a second storage device,
said second storage control system executes a journal reflection program which recovers data based on a journal and a journal transfer program which receives said transferred journal from said first storage system,
when said journal is being transferred from said first storage system to said second storage system,
said first storage controller, while said journal is being stored in a certain logical volume of said first storage system, switches a logical volume for storage to another logical volume of said first storage device, and
said second storage controller, while said journal is being transferred to a certain logical volume of said second storage device, switches a transfer-target logical volume to another logical volume of said second storage device.

21. A data processing system, comprising:
a primary site which includes a first computer and a first storage system connected to said first computer; and
a secondary site which includes a second computer and a second storage system connected to said second computer;
wherein,
said first storage system and said second storage system are connected to each other via a communication line;
said first storage system records update history of data as a journal in a storage device, and transfers said journal to said second storage system via said communication line; and
said second storage system stores said transferred journal to a storage device;
wherein said second storage system acquires information related to a journal recorded in said first storage system, and said second storage system issues a command requesting said first storage system to send said journal; and
wherein said journal recorded in a storage device of said first storage system is stored in a plurality of logical volumes, a logical volume for storage is switched to another logical volume, while the journal is stored in a certain logical volume, and said switching is made at a time when a command for requesting dispatch of said journal is received from said second storage system.

22. A data processing system according to claim 21, wherein said second storage system executes data recovery based on said stored journal.

23. A data processing system, comprising:
a primary site which includes a first computer and a first storage system connected to said first computer; and
a secondary site which includes a second computer and a second storage system connected to said second computer;
wherein,
said first storage system and said second storage system are connected to each other via a communication line;

said first storage system records update history of data as a journal in a storage device, and transfers said journal to said second storage system via said communication line; and said second storage system stores said transferred journal to a storage device;

wherein said second storage system acquires information related to a journal recorded in said first storage system, and said second storage system issues a command requesting said first storage system to send said journal; and wherein said transferred journal in said second storage system is stored in a plurality of logical volumes, a transfer-target logical volume is switched to another logical volume, while the journal is transferred to a certain logical volume, and said switching is made at a time when said journal transfer is started at said first storage system.

24. A data processing system according to claim 23, wherein said second storage system executes data recovery based on said stored journal.

25. A data processing system, comprising:

a first storage system, in a primary site, coupled to a first computer and having a first logical volume for storing data sent from said first computer, said first logical volume related to at least one disk drive in said first storage system; and a second storage system, in a secondary site, coupled to a second computer and having a second logical volume related to at least one disk drive in said second storage system, said second logical volume forming a pair relationship of a remote copy process with said first logical volume and storing data already stored in said first logical volume;

wherein said first storage system receives update data sent from said host computer and stores said update data into said first logical volume and transfers said update data to said second storage system such a way that said second computer is not in a transport path of said transferred update data from said first storage system to said second storage system;

wherein said second storage system stores said transferred update data into at least one of third logical volumes and reads said stored update data from said at least one of third logical volumes and writes said read update data to said second logical volume; and said at least one of said third logical volumes is switched to another one of said third logical volumes during said remote copy process.

26. A data processing system, comprising:

a primary site which includes a first computer and a first storage system connected to said first computer; and a secondary site which includes a second computer and a second storage system connected to said second computer;

wherein, said first storage system and said second storage system are connected to each other via a communication line;

said first storage system records update history of data as a journal in a storage device, and transfers said journal to said second storage system via said communication line in such a way that said second computer is not in a transport path of said journal from said first storage system to said second storage system;

said second storage system stores said transferred journal to a storage device;

said journal recorded in the storage device of said first storage system is stored in a plurality of logical volumes; and the journal is stored in a certain logical volume, a logical volume for storage is switched to another logical volume.

27. A data processing system according to claim 26, wherein said second storage system executes data recovery based on said stored journal.

28. A data processing system according to claim 26, wherein said switching is made at a time as designated by a user.

29. A data processing system according to claim 26, wherein said switching is executed at a time when transfer of the logical volume in which the target journal for transfer to said secondary site is stored is completed.

30. A data processing system according to claim 26, wherein said transferred journal in said second storage system is stored in a plurality of logical volumes, and while the journal is transferred to a certain logical volume, a transfer-target logical volume is switched to another logical volume.

31. A data processing system according to claim 30, wherein said switching is made at a time as designated by a user.

32. A data processing system according to claim 30, wherein said second storage system recovers data based on said stored journal, and said switching is made at a time when all logical volumes which store a journal used for recovery are recovered.

33. A data processing system, comprising:

a primary site which includes a first computer and a first storage system connected to said first computer; and a secondary site which includes a second computer and a second storage system connected to said second computer;

wherein, said first storage system and said second storage system are connected to each other via a communication line;

said first storage system records update history of data as a journal in a storage device, and transfers said journal to said second storage system via said communication line in such a way that said second computer is not in a transport path of said journal from said first storage system to said second storage system;

said second storage system stores said transferred journal to a storage device;

said second storage system acquires information related to a journal recorded in said first storage system, and said second storage system issues a command requesting said first storage system to send said journal;

said journal recorded in a storage device of said first storage system is stored in a plurality of logical volumes, a logical volume for storage is switched to another logical volume, while the journal is stored in a certain logical volume, and said switching is made at a time when a command for requesting dispatch of said journal is received from said second storage system.

34. A data processing system, comprising:

a primary site which includes a first computer and a first storage system connected to said first computer; and a secondary site which includes a second computer and a second storage system connected to said second computer;

wherein,
said first storage system and said second storage system are connected to each other via a communication line;
said first storage system records update history of data as a journal in a storage device, and transfers said journal to said second storage system via said communication line in such a way that said second computer is not in a transport path of said journal from said first storage system to said second storage system;
said second storage system stores said transferred journal to a storage device;
said second storage system acquires information related to a journal recorded in said first storage system, and
said second storage system issues a command requesting said first storage system to send said journal;
said transferred journal in said second storage system is stored in a plurality of logical volumes,
a transfer-target logical volume is switched to another logical volume, while the journal is transferred to a certain logical volume, and
said switching is made at a time when said journal transfer is started at said first storage system.

35. A data processing system, comprising:
a primary site which includes a first computer and a first storage system connected to said first computer, said first storage system having a first logical volume for storing data sent from said first computer, said first logical volume related to at least one disk drive in said first storage system; and
a secondary site which includes a second computer and a second storage system connected to said second computer, said second storage system having a second logical volume related to at least one disk drive in said second storage system, said second logical volume forming a pair relationship of a remote copy process with said first logical volume and storing data already stored in said first logical volume; wherein,
said first storage system and said second storage system are connected to each other via a communication line,
said first storage system includes a first storage controller and a first storage device,
said first storage controller stores update data to be stored in said first logical volume into at least one of third logical volumes, and transfers said update data stored in said at least one of third logical volumes to said second storage system via said communication line,
said second storage system includes a second storage controller and a second storage device,
said second storage control system receives said transferred update data from said first storage system and recovers data based on said transferred update data,
when said update data is being transferred from said first storage system to said second storage system,
said first storage controller, while said update data is being stored in a certain logical volume of said first storage system, switches a logical volume for storage to another logical volume of said first storage device, and
said second storage controller, while said update data is being transferred to a certain logical volume of said second storage device, switches a transfer-target logical volume to another logical volume of said second storage device.

36. A data processing system, comprising:
a primary site which includes a first computer and a first storage system connected to said first computer, said first storage system having a first logical volume for storing data sent from said first computer, said first logical volume related to at least one disk drive in said first storage system; and
a secondary site which includes a second computer and a second storage system connected to said second computer, said second storage system having a second logical volume related to at least one disk drive in said second storage system, said second logical volume forming a pair relationship of a remote copy process with said first logical volume and storing data already stored in said first logical volume;
wherein,
said first storage system and said second storage system are connected to each other via a communication line;
said first storage system stores update data to be stored in said first logical volume into at least one of third logical volumes, and transfers said update data stored in said at least one of third logical volumes to said second storage system via said communication line; and
said second storage system stores said transferred update data to a storage device;
wherein said second storage system acquires information related to update data recorded in said first storage system, and said second storage system issues a command requesting said first storage system to send said update data; and
wherein said update data recorded in a storage device of said first storage system is stored in a plurality of logical volumes, a logical volume for storage is switched to another logical volume, while the update data is stored in a certain logical volume, and said switching is made at a time when a command for requesting dispatch of said update data is received from said second storage system.

37. A data processing system according to claim 36, wherein said second storage system executes data recovery based on said stored journal.

38. A data processing system, comprising:
a primary site which includes a first computer and a first storage system connected to said first computer, said first storage system having a first logical volume for storing data sent from said first computer, said first logical volume related to at least one disk drive in said first storage system; and
a secondary site which includes a second computer and a second storage system connected to said second computer, said second storage system having a second logical volume related to at least one disk drive in said second storage system, said second logical volume forming a pair relationship of a remote copy process with said first logical volume and storing data already stored in said first logical volume;
wherein,
said first storage system and said second storage system are connected to each other via a communication line;
said first storage system stores update data to be stored in said first logical volume into at least one of third logical volumes, and transfers said update data stored in said at least one of third logical volumes to said second storage system via said communication line; and
said second storage system stores said transferred update data to a storage device;
wherein said second storage system acquires information related to update data recorded in said first storage system, and said second storage system issues a command requesting said first storage system to send said update data; and wherein said transferred update data in said second storage system is stored in a plurality of logical volumes, a transfer-target logical volume is switched to another logical volume, while the update data is transferred to a certain logical volume, and said switching is made at a time when said update data transfer is started at said first storage system.

39. A data processing system according to claim 38, wherein said second storage system executes data recovery based on said stored journal.

* * * * *